United States Patent [19]
Takahashi et al.

[11] Patent Number: 5,966,495
[45] Date of Patent: Oct. 12, 1999

[54] RECORDING AND REPRODUCING APPARATUS

[75] Inventors: Koji Takahashi; Isao Harigaya, both of Kanagawa-ken, Japan

[73] Assignee: Canon Kabushiki Kaisha, Tokyo, Japan

[21] Appl. No.: 08/782,762

[22] Filed: Jan. 13, 1997

Related U.S. Application Data

[63] Continuation of application No. 08/238,233, May 4, 1994, abandoned.

[30] Foreign Application Priority Data

May 12, 1993 [JP] Japan .................................. 5-133946
May 12, 1993 [JP] Japan .................................. 5-133947

[51] Int. Cl.$^6$ ............................ H04N 5/76; H04N 5/225
[52] U.S. Cl. ............................ 386/68; 386/69; 386/109; 386/95; 358/909.1; 348/231
[58] Field of Search .............................. 386/1, 6, 38, 45, 386/68–70, 95, 117, 120, 125–126, 109; 358/906, 909.1; 348/231–233; 369/32, 48, 54; 360/32, 48; H04N 5/76, 5/92, 5/91, 5/225

[56] References Cited

U.S. PATENT DOCUMENTS

| | | |
|---|---|---|
| 4,965,675 | 10/1990 | Hori et al. ............................ 358/341 |
| 5,032,927 | 7/1991 | Watanabe et al. ...................... 358/335 |
| 5,166,804 | 11/1992 | Takahashi .............................. 358/342 |
| 5,239,382 | 8/1993 | Hatakenaka et al. .................... 358/906 |
| 5,363,362 | 11/1994 | Maeda et al. .......................... 358/342 |
| 5,400,305 | 3/1995 | Sadanaka .............................. 358/342 |
| 5,424,733 | 6/1995 | Fimoff et al. .......................... 341/67 |
| 5,430,553 | 7/1995 | Misono et al. ......................... 358/342 |
| 5,434,678 | 7/1995 | Abecassis ............................. 358/342 |
| 5,442,454 | 8/1995 | Aoki et al. ............................ 358/341 |

*Primary Examiner*—Thai Tran
*Attorney, Agent, or Firm*—Robin, Blecker & Daley

[57] ABSTRACT

A recording and reproducing apparatus includes a recording circuit for forming predetermined memory units by correlating video information and audio information with retrieval information for retrieval of the video information and the audio information, and sequentially recording the predetermined memory units in a solid-state memory device at intervals of predetermined time, a file generating circuit for generating a retrieval information file for retrieving the video information and the audio information on the basis of the retrieval information, and a reproducing circuit for reading out the video information and the audio information from the solid-state memory device on the basis of information contained in the retrieval information file and reproducing a video signal and an audio signal from the solid-state memory device, during retrieval of information recorded in the solid-state memory device.

46 Claims, 28 Drawing Sheets

F I G.3
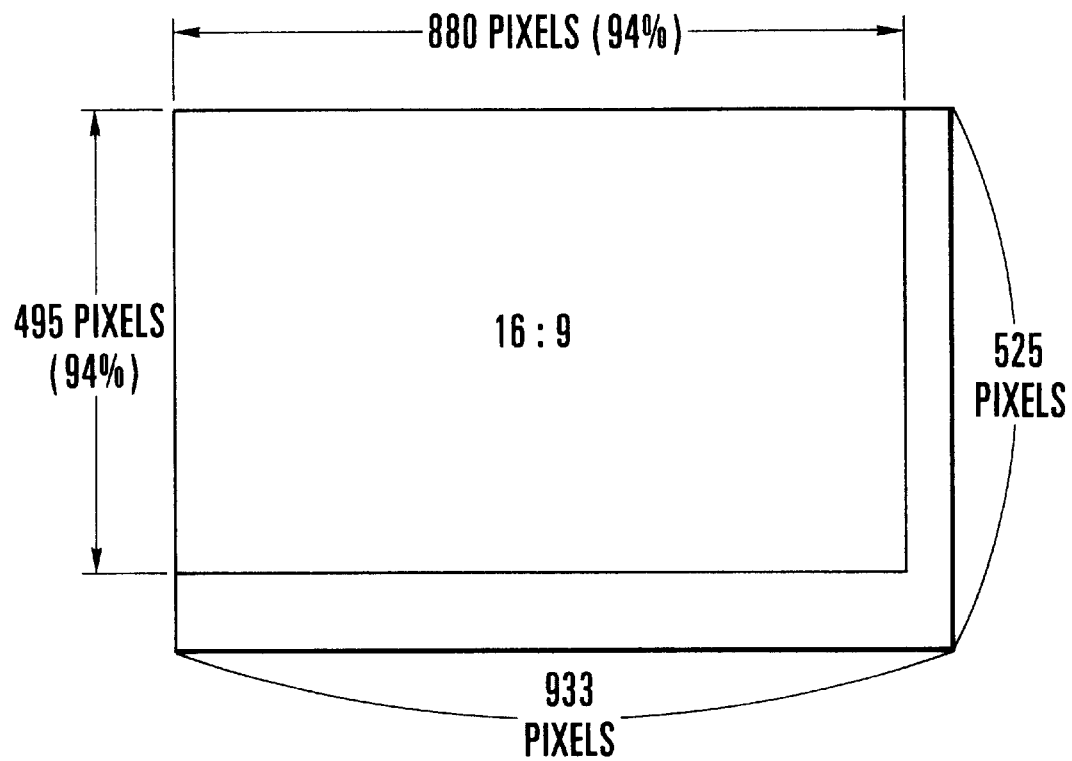

FIG.5

ID FILE (43)

| STARTING No. | ENDING No. |
|---|---|
| 0 | 10 |
| 11 | 20 |
| 21 | 57 |
| 58 | 66 |
| 67 | 89 |
| 90 | 112 |
| 113 | 155 |
| 156 | 188 |
| 189 | 223 |
| 224 | 256 |
|  |  |
|  |  |
|  |  |

FIG.9

| INDEX | | | | ID FILE | | CONTENTS FILE |
|---|---|---|---|---|---|---|
| LEVEL I | LEVEL II | LEVEL III | LEVEL IV | STARTING No. | ENDING No. | CONTENT TITLE |
| 1 | 1 | 1 | 0 | 0 | 10 | MORNING |
| 1 | 1 | 2 | 0 | 11 | 20 | MORNING |
| 1 | 1 | 3 | 0 | 21 | 57 | MORNING |
| 1 | 1 | 4 | 0 | 58 | 66 | MORNING |
| 1 | 1 | 5 | 0 | 67 | 89 | MORNING |
| 1 | 2 | 1 | 0 | 90 | 112 | PARTY |
| 1 | 2 | 2 | 0 | 113 | 155 | PARTY |
| 2 | 1 | 1 | 0 | 156 | 188 | BIRTHDAY |
| 2 | 1 | 2 | 0 | 189 | 223 | BIRTHDAY |
| 2 | 1 | 3 | 0 | 224 | 256 | BIRTHDAY |

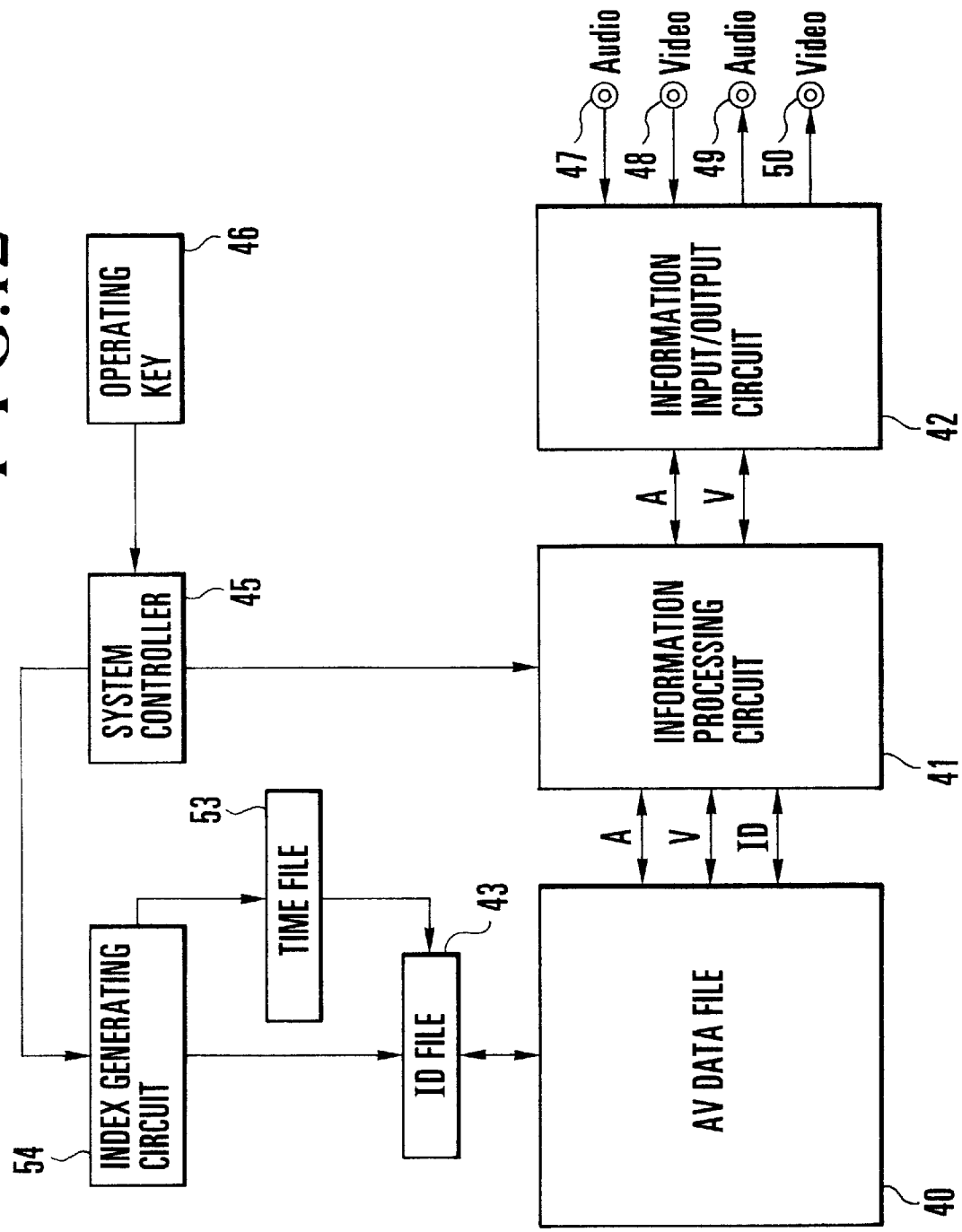
F I G. 12

FIG.13

| INDEX | | | | ID FILE | | TIME FILE | |
|---|---|---|---|---|---|---|---|
| LEVEL I | LEVEL II | LEVEL III | LEVEL IV | STARTING No. | ENDING No. | STARTING YEAR/ MONTH/ DAY | STARTING HOUR/ MINUTE/ SECOND |
| 1 | 1 | 1 | 0 | 0 | 10 | 19910706 | 07:25:30 |
| 1 | 1 | 2 | 0 | 11 | 20 | 19910706 | 07:30:18 |
| 1 | 1 | 3 | 0 | 21 | 57 | 19910706 | 07:42:56 |
| 1 | 1 | 4 | 0 | 58 | 66 | 19910706 | 07:55:18 |
| 1 | 1 | 5 | 0 | 67 | 89 | 19910706 | 08:08:21 |
| 1 | 2 | 1 | 0 | 90 | 112 | 19910706 | 19:02:43 |
| 1 | 2 | 2 | 0 | 113 | 155 | 19910706 | 20:23:11 |
| 2 | 1 | 1 | 0 | 156 | 188 | 19911217 | 11:55:23 |
| 2 | 1 | 2 | 0 | 189 | 223 | 19911217 | 12:23:35 |
| 2 | 1 | 3 | 0 | 224 | 256 | 19911217 | 13:07:15 |
| | | | | | | | |
| | | | | | | | |
| | | | | | | | |

FIG.17

| INDEX | | | | ID FILE | | TIME FILE | | CONTENTS FILE |
|---|---|---|---|---|---|---|---|---|
| LEVEL I | LEVEL II | LEVEL III | LEVEL IV | STARTING No. | ENDING No. | STARTING YEAR/ MONTH/ DAY | STARTING HOUR/ MINUTE/ SECOND | CONTENT TITLE |
| 1 | 1 | 1 | 0 | 0 | 1 0 | 19910706 | 07:25:30 | MORNING |
| 1 | 1 | 2 | 0 | 1 1 | 2 0 | 19910706 | 07:30:18 | MORNING |
| 1 | 1 | 3 | 0 | 2 1 | 5 7 | 19910706 | 07:42:56 | MORNING |
| 1 | 1 | 4 | 0 | 5 8 | 6 6 | 19910706 | 07:55:18 | MORNING |
| 1 | 1 | 5 | 0 | 6 7 | 8 9 | 19910706 | 08:08:21 | MORNING |
| 1 | 2 | 1 | 0 | 9 0 | 1 1 2 | 19910706 | 19:02:43 | PARTY |
| 1 | 2 | 2 | 0 | 1 1 3 | 1 5 5 | 19910706 | 20:23:11 | PARTY |
| 2 | 1 | 1 | 0 | 1 5 6 | 1 8 8 | 19911217 | 11:55:23 | BIRTHDAY |
| 2 | 1 | 2 | 0 | 1 8 9 | 2 2 3 | 19911217 | 12:23:35 | BIRTHDAY |
| 2 | 1 | 3 | 0 | 2 2 4 | 2 5 6 | 19911217 | 13:07:15 | BIRTHDAY |

F I G. 21(a)

| ACTIVE | ID | TIME CODE | MODE OF IMAGE QUALITY | VIDEO DATA LENGTH | VIDEO STARTING ADDRESS | MODE OF SOUND QUALITY | AUDIO DATA LENGTH | AUDIO STARTING ADDRESS | 0 | L ch RESET | R ch RESET | COMPRESSED AUDIO DATA | VIDEO RESET | COMPRESSED VIDEO DATA |

F I G. 21(b)

| DELETE | ID | TIME CODE | MODE OF IMAGE QUALITY | VIDEO DATA LENGTH | VIDEO STARTING ADDRESS | MODE OF SOUND QUALITY | AUDIO DATA LENGTH | AUDIO STARTING ADDRESS | 1 | L ch RESET | R ch RESET | COMPRESSED AUDIO DATA | VIDEO RESET | COMPRESSED VIDEO DATA |

FIG.22

| ID-001 | ID-002 | ID-003 | ID-004 | ID-005 |
|---|---|---|---|---|
| ID-006 | ID-007 | ID-008 | ID-009 | ID-010 |
| ID-011 | ID-012 | ID-013 | ID-014 | ID-015 |
| ID-016 | ID-017 | ID-018 | ID-019 | ID-020 |
| ID-021 | ID-022 | ID-023 | ID-024 | ID-025 |
| ID-026 | ID-027 | ID-028 | ID-029 | ID-030 |
| ID-031 | ID-032 | ID-033 | ID-034 | ID-035 |
| ID-036 | ID-037 | ID-038 | ID-039 | ID-040 |
| ID-041 | ID-042 | ID-043 | ID-044 | ID-045 |
| ID-046 | ID-047 | ID-048 | ID-049 | ID-050 |
| ID-051 | ID-052 | ID-053 | ID-054 | ID-055 |
| ID-056 | ID-057 | ID-058 | ID-059 | ID-060 |

FIG.23

| ID-001-0 | ID-002-0 | ID-003-0 | ID-004-0 | ID-005-0 |
|---|---|---|---|---|
| ID-006-0 | ID-007-0 | ID-008-0 | ID-009-0 | ID-010-0 |
| ID-011-0 | ID-012-0 | ID-013-0 | ID-014-0 | ID-015-0 |
| ID-016-0 | ID-017-0 | ID-018-0 | ID-019-0 | ID-020-0 |
| ID-021-0 | ID-022-0 | ID-023-0 | ID-024-0 | ID-025-0 |
| ID-026-0 | ID-027-0 | ID-028-0 | ID-029-0 | ID-030-0 |
| ID-031-0 | ID-032-0 | ID-033-0 | ID-034-0 | ID-035-0 |
| ID-036-0 | ID-037-0 | ID-038-0 | ID-039-0 | ID-040-0 |
| ID-041-0 | ID-042-0 | ID-043-0 | ID-044-0 | ID-045-0 |
| ID-046-0 | ID-047-0 | ID-048-0 | ID-049-0 | ID-050-0 |
| ID-051-0 | ID-052-0 | ID-053-0 | ID-054-0 | ID-055-0 |
| ID-056-0 | ID-057-0 | ID-058-0 | ID-059-0 | ID-060-0 |
|  |  |  |  |  |
|  |  |  |  |  |
|  |  |  |  |  |
| ID-011-1 | ID-012-1 | ID-013-1 | ID-014-1 | ID-015-1 |
| ID-016-1 | ID-017-1 | ID-018-1 | ID-019-1 | ID-020-1 |

FIG.25

| ID-001-0 | ID-002-0 | ID-003-0 | ID-004-0 | ID-005-0 |
|---|---|---|---|---|
| ID-006-0 | ID-007-0 | ID-008-0 | ID-009-0 | ID-010-0 |
| ID-011-0 | ID-012-0 | ID-013-0 | ID-014-0 | ID-015-0 |
|  |  |  |  |  |
| ID-021-0 | ID-022-0 | ID-023-0 | ID-024-0 | ID-025-0 |
| ID-026-0 | ID-027-0 | ID-028-0 | ID-029-0 | ID-030-0 |
| ID-031-0 | ID-032-0 | ID-033-0 | ID-034-0 | ID-035-0 |
| ID-036-0 | ID-037-0 | ID-038-0 | ID-039-0 | ID-040-0 |
| ID-041-0 | ID-042-0 | ID-043-0 | ID-044-0 | ID-045-0 |
| ID-046-0 | ID-047-0 | ID-048-0 | ID-049-0 | ID-050-0 |
| ID-051-0 | ID-052-0 | ID-053-0 | ID-054-0 | ID-055-0 |
| ID-056-0 | ID-057-0 | ID-058-0 | ID-059-0 | ID-060-0 |
|  |  |  |  |  |
|  |  |  |  |  |
|  |  |  |  |  |
| ID-011-1 | ID-012-1 | ID-013-1 | ID-014-1 | ID-015-1 |
| ID-016-1 | ID-017-1 | ID-018-1 | ID-019-1 | ID-020-1 |

FIG.26

| ID-001-0 | ID-002-0 | ID-003-0 | ID-004-0 | ID-005-0 |
|---|---|---|---|---|
| ID-006-0 | ID-007-0 | ID-008-0 | ID-009-0 | ID-010-0 |
| ID-011-0 | ID-012-0 | ID-013-0 | ID-014-0 | ID-015-0 |
| ID-016-0 | ID-017-0 | ID-018-0 | ID-019-0 | ID-020-0 |
| ID-021-0 | ID-022-0 | ID-023-0 | ID-024-0 | ID-025-0 |
| ID-026-0 | ID-027-0 | ID-028-0 | ID-029-0 | ID-030-0 |
| ID-031-0 | ID-032-0 | ID-033-0 | ID-034-0 | ID-035-0 |
| ID-036-0 | ID-037-0 | ID-038-0 | ID-039-0 | ID-040-0 |
| ID-041-0 | ID-042-0 | ID-043-0 | ID-044-0 | ID-045-0 |
| ID-046-0 | ID-047-0 | ID-048-0 | ID-049-0 | ID-050-0 |
| ID-051-0 | ID-052-0 | ID-053-0 | ID-054-0 | ID-055-0 |
|  |  |  |  |  |
|  |  |  |  |  |
|  |  |  |  |  |
|  |  |  |  |  |
| ID-011-1 | ID-012-1 | ID-013-1 | ID-014-1 | ID-015-1 |
| ID-016-1 | ID-017-1 | ID-018-1 | ID-019-1 | ID-020-1 |

FIG.27

| ID-001 | ID-002 | ID-003 | ID-004 | ID-005 |
|--------|--------|--------|--------|--------|
| ID-006 | ID-007 | ID-008 | ID-009 | ID-010 |
| ID-011 | ID-012 | ID-013 | ID-014 | ID-015 |
| ID-016 | ID-017 | ID-018 | ID-019 | ID-020 |
| ID-021 | ID-022 | ID-023 | ID-024 | ID-025 |
| ID-026 | ID-027 | ID-028 | ID-029 | ID-030 |
| ID-031 | ID-032 | ID-033 | ID-034 | ID-035 |
| ID-036 | ID-037 | ID-038 | ID-039 | ID-040 |
| ID-041 | ID-042 | ID-043 | ID-044 | ID-045 |
| ID-046 | ID-047 | ID-048 | ID-049 | ID-050 |
| ID-051 | ID-052 | ID-053 | ID-054 | ID-055 |

FIG. 28(a)

| ID | TIME CODE | MODE OF IMAGE QUALITY | VIDEO DATA LENGTH | VIDEO STARTING ADDRESS | MODE OF SOUND QUALITY | AUDIO DATA LENGTH | AUDIO STARTING ADDRESS | DELETED FLAG (0) | NEXT | L ch RESET | R ch RESET | COMPRESSED AUDIO DATA | VIDEO RESET | COMPRESSED VIDEO DATA |
|---|---|---|---|---|---|---|---|---|---|---|---|---|---|---|

ACTIVE

FIG. 28(b)

| ID | TIME CODE | MODE OF IMAGE QUALITY | VIDEO DATA LENGTH | VIDEO STARTING ADDRESS | MODE OF SOUND QUALITY | AUDIO DATA LENGTH | AUDIO STARTING ADDRESS | DELETED FLAG (1) | NEXT ID ADDRESS | L ch RESET | R ch RESET | COMPRESSED AUDIO DATA | VIDEO RESET | COMPRESSED VIDEO DATA |
|---|---|---|---|---|---|---|---|---|---|---|---|---|---|---|

DELETE

RECORDING AND REPRODUCING APPARATUS

This is a continuation application under 37 CFR 1.62 of prior application Ser. No. 08/238,233 filed on May 4, 1994, now abandoned.

BACKGROUND OF THE INVENTION

1. Field of the Invention

The present invention relates to a recording and reproducing apparatus for performing recording and reproduction of video information and audio information and, more particularly, to a recording and reproducing apparatus for retrieving and reproducing the video information and the audio information.

2. Description of the Related Art

Conventionally, to record or reproduce a moving-image signal, it has generally been to employ a so-called VTR (video tape recorder) which uses magnetic tape having a tape width of ½ inch or 8 mm as a recording medium.

In such a VTR, a rotary head provided on a rotary drum is used to record and reproduce video information for one field per track on and from magnetic tape wrapped around the rotary drum. In the VTR, retrieval of video information, i.e., cueing, is performed while actually reproducing recorded video information by utilizing functions using an index signal for cueing a video scene, such as "fast forward feed", "rewinding control" and "special reproduction".

However, if the retrieval is performed in the conventional VTR, since the video information is recorded on a tape-shaped recording medium, the time taken to transport tape is needed to retrieve desired video information, and the retrieval may occasionally require time-consuming and exhausting operations.

Also, during the retrieval operation, the rotary head is tracing the magnetic tape while repetitively making contact with the magnetic tape on which information is recorded. As a result, the magnetic tape may be abraded or scratched to adversely affect the reliability of the recorded information.

Another problem is that in the case of a VTR adopting a recording system based on an analog signal, if retrieved information is copied (duplicated) to another medium, a degradation of image quality due to so-called dubbing is caused.

SUMMARY OF THE INVENTION

One object of the present invention which has been made to solve the above-described problems is to provide a recording and reproducing apparatus capable of easily and efficiently effecting retrieval of information and also of preventing a decrease in the reliability of reproduced data.

In accordance with one aspect of the present invention, there is provided a recording and reproducing apparatus which comprises recording means for forming predetermined memory units by correlating video information and audio information with search information for search of the video information and/or the audio information, and sequentially recording the predetermined memory units in a memory device at intervals of predetermined time, file generating means for generating a search information file for searching the video information and/or the audio information on the basis of the search information, and reproducing means for reading out the video information and/or the audio information from the memory device on the basis of information contained in the search information file and reproducing a video signal and/or an audio signal from the memory device, during search of information recorded in the memory device.

In accordance with another aspect of the present invention, there is provided a recording and reproducing apparatus which comprises recording means for forming predetermined memory units by correlating video information and audio information with search information for search of the video information and/or the audio information, and sequentially recording the predetermined memory units in a memory device at intervals of predetermined time, file generating means for generating a search information file for searching the video information and/or the audio information on the basis of the search information and generating a search data file for searching the video information and/or the audio information in accordance with a variation in information indicative of an operational state of the recording and reproducing apparatus, and reproducing means for reading out the video information and/or the audio information from the memory device on the basis of information contained in the search information file and the search data file and reproducing a video signal and/or an audio signal from the memory device, during search of information recorded in the memory device.

In accordance with another aspect of the present invention, there is provided a recording and reproducing apparatus which comprises recording means for forming predetermined memory units by correlating video information and audio information with retrieval information for retrieval of the video information and/or the audio information, and sequentially recording the predetermined memory units in a solid-state memory device at intervals of predetermined time, file generating means for generating a retrieval information file for retrieving the video information and/or the audio information on the basis of the retrieval information and generating a retrieval data file for retrieving the video information and/or the audio information on the basis of an instant of time at which is recorded information formed in accordance with a variation in information indicative of an operational state of the recording and reproducing apparatus, the retrieval data file being generated by being correlated with the retrieval information file, and reproducing means for reading out the video information and/or the audio information from the solid-state memory device on the basis of information contained in the retrieval information file and the retrieval data file and reproducing a video signal and/or an audio signal from the solid-state memory device, during retrieval of information recorded in the solid-state memory device.

In accordance with each of the above aspects of the present invention arranged in the above-described manner, during reproduction, the video information and the audio information recorded in the memory device in the predetermined memory units are retrieved and reproduced through address management of the memory device on the basis of the data file for information retrieval which is generated by being correlated with the retrieval information. Accordingly, unlike the conventional arrangements, it is possible to easily perform retrieval of information in a short time without performing, for example, fast forward feeding or rewinding of a tape-shaped recording medium, and it is possible to efficiently utilize a limited memory area.

Another object of the present invention is to provide a recording and reproducing apparatus which makes it possible to easily edit recorded information.

To achieve the above object, in accordance with another aspect of the present invention, there is provided a recording and reproducing apparatus which comprises recording means for forming predetermined memory units by correlating video information and audio information with retrieval information for retrieval of the video information and/or the audio information, and sequentially recording the predetermined memory units in a memory device at intervals of predetermined time, and reproducing means for reading out the video information and/or the audio information from the solid-state memory device on the basis of the retrieval information and reproducing a video signal and/or an audio signal from the memory device, during retrieval of information recorded in the memory device.

In accordance with another aspect of the present invention, a logically erased state is set during the editing of the information recorded in the memory device and information to be deleted is placed in the logically erased state in the memory device so that the information placed in the logically erased state can be recovered at any time as required before the information is completely erased from the memory device.

In accordance with another aspect of the present invention, each of the video information and the audio information may be information of variable length formed by data compression processing using variable-length coding and the retrieval information may be information of fixed length.

In accordance with another aspect of the present invention, address information indicative of a position in which information is recorded which constitutes a memory unit to be reproduced subsequently to information which constitutes a memory unit which is currently being reproduced by said reproducing means may be provided as one item of the retrieval information.

In accordance with a further aspect of the present invention, the retrieval information may be grouped into predetermined units to be managed, and the information to be deleted may be globally set in each of the predetermined units during the editing of the information recorded in the solid-state memory device.

In accordance with each of the above aspects of the present invention arranged in the above-described manner, during reproduction, the video information and the audio information recorded in the memory device in the predetermined memory units are retrieved and reproduced through address management of the memory device on the basis of the retrieval information for retrieval of the video information and the audio information. Accordingly, unlike the conventional arrangements, it is possible to easily perform retrieval of information in a short time without performing, for example, fast forward feeding or rewinding of a tape-shaped recording medium.

In particular, since the retrieval information for retrieval of the video information and the audio information each having a variable length is constructed as information of fixed length, the amount of data to be recorded can be reduced so that a limited memory area can be efficiently utilized.

Also, during editing of information, before information to be deleted is completely erased from a memory device by physical erasure, the information to be deleted is stored in a logically erased state on the memory device by setting a recoverable, logically erased state through a predetermined operation. Accordingly, the setting of the logically erased state can be easily recovered, as required, and the information can be easily recovered.

Further, address information indicative of a position in which is recorded information to be reproduced subsequently to information which is currently being reproduced is provided as one item of retrieval information. Accordingly, video information and audio information are retrieved and reproduced on the basis of the address information, and information items which are recorded spatially separately from each other can be correctly joined and continuously reproduced. Accordingly, during editing of information, even if there is a difference between the recording time of information to be newly inserted and the recording time of information to be deleted, it is substantially possible to exchange the information to be deleted for the information to be newly inserted and record the new information.

Further, during the above-described editing of information, information to be deleted is globally set by performing information retrieval for each of the predetermined units into which the information is grouped, whereby the information to be deleted can be set only by specifying a desired group. Accordingly, it is possible to perform the editing of the information by a simple operation.

The above and other objects, features and advantages of the present invention will become apparent from the following detailed description of preferred embodiments of the present invention, taken in conjunction with the accompanying drawings.

BRIEF DESCRIPTION OF THE DRAWINGS

FIG. 3 is a schematic view of a television picture, which serves to illustrate one example of an input video signal;

FIG. 5 is a view showing a construction example of an ID file;

FIG. 9 is a view showing a construction example of a data file;

FIG. 12 is a flowchart showing the arrangement of a recording and reproducing apparatus for implementing data retrieval according to a third embodiment;

FIG. 13 is a view showing a construction example of a data file;

FIG. 17 is a view showing a construction example of index information for data retrieval as well as each data file;

FIGS. 21(*a*) and 21(*b*) are views showing construction examples of ID data;

FIG. 22 is a view showing an apparent data construction example of an ID file;

FIG. 23 is a view showing a data construction example of the ID file as well as the state of deleted flags;

FIG. 25 is a view showing a data construction example of the ID file as well as the state of the deleted flags before renumbering processing;

FIG. 26 is a view showing a data construction of the ID file as well as the state of the deleted flags after the renumbering processing;

FIG. 27 is a view showing an apparent data construction of the ID file after the renumbering processing; and FIGS. 28(*a*) and 28(*b*) are views showing other construction examples of the ID data.

DETAILED DESCRIPTION OF THE PREFERRED EMBODIMENTS

Figure 1:
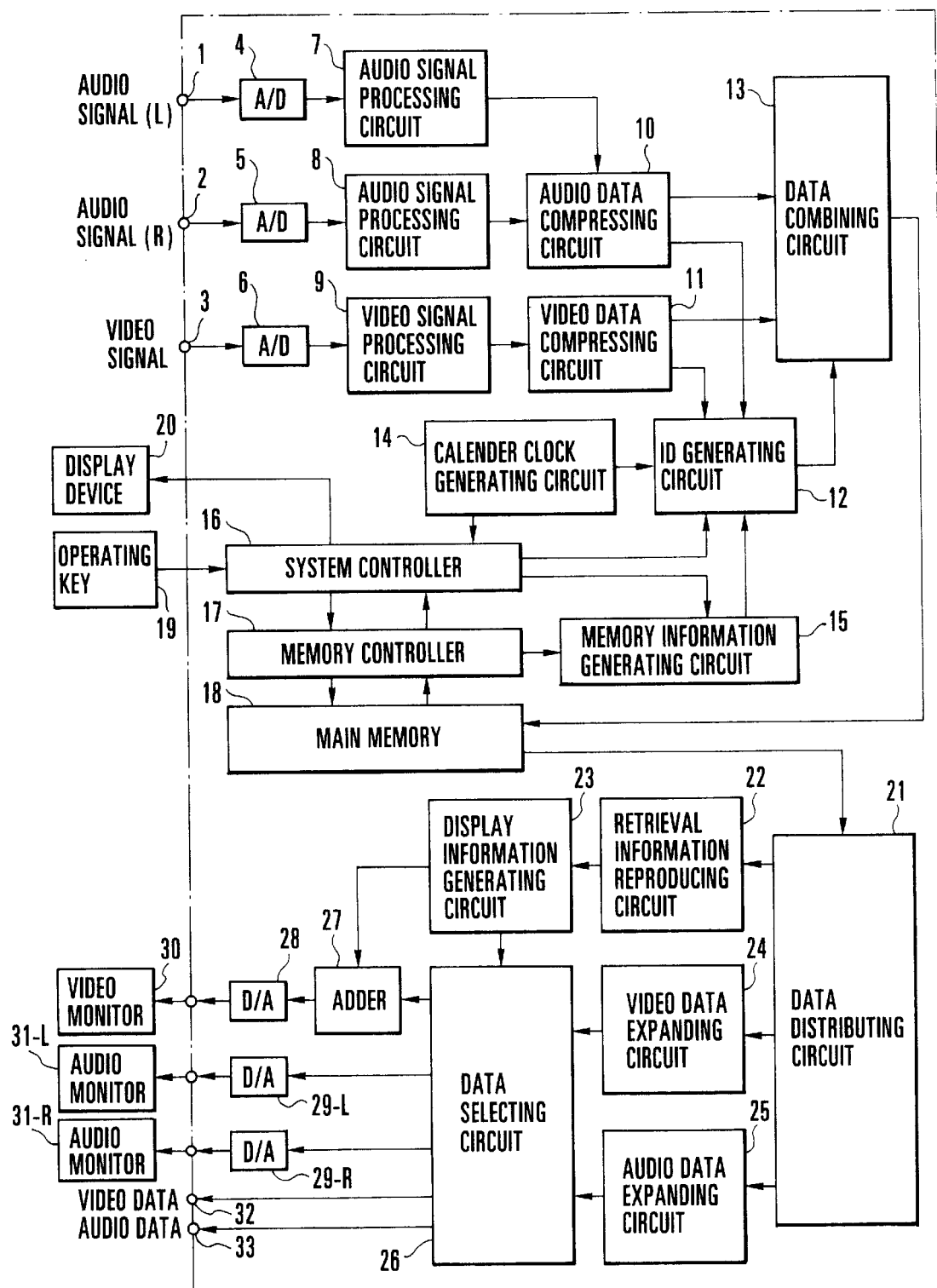
FIG. 1 is a block diagram showing one embodiment of a recording and reproducing apparatus according to the present invention.

FIG. 1 is a block diagram showing one embodiment of a recording and reproducing apparatus according to the present invention.

The recording and reproducing apparatus shown in FIG. 1 includes input terminals 1 and 2 through which to input a left (L) channel audio signal and a right (R) channel audio signal, respectively, an input terminal 3 through which to input a video signal, A/D converters 4 and 5 for converting the left channel and right channel signals into digital signals, respectively, and an A/D converter 6 for converting the video signal into a digital signal.

The shown recording and reproducing apparatus also includes audio signal processing circuits 7 and 8 for applying predetermined processing to the left channel and right channel digital audio signals, respectively, a video signal processing circuit 9 for applying predetermined processing to the digital video signal, an audio data compressing circuit 10 for performing compression processing of the left channel and right channel audio data processed by the respective audio signal processing circuits 7 and 8, and a video data compressing circuit 11 for performing compression processing of the video data processed by the video signal processing circuit 9.

The shown recording and reproducing apparatus also includes an ID generating circuit 12 for generating retrieval information (ID data) for data retrieval on the basis of a time code, memory information and the like as will be described later, a data combining circuit 13 for generating a data block for each ID data from the compressed audio data, the compressed video data and the ID data, and a main memory 18 which serves as a recording medium in which to record the data block and which is made up of solid-state devices.

The shown recording and reproducing apparatus also includes a memory controller 17 for controlling reading from and writing to the main memory 18, a system controller 16 for controlling the memory controller 17 and the entire apparatus, a calendar clock generating circuit 14 for generating a time code such as year, month, day, hour, minute, second and the like, a memory information generating circuit 15 for generating memory information indicative of the amount of data contained in information stored in the main memory 18, operating keys 19 to be operated by a user, and a display device 20 for displaying the required information such as an operating mode which is selected in the apparatus.

The shown recording and reproducing apparatus also includes a data distributing circuit 21 for distributing the data block read from the main memory 18 into ID data, video data and audio data, a retrieval information reproducing circuit 22 for reproducing the ID data from the distributed data, a display information generating circuit 23 for reproducing display information from the ID data, a video data expanding circuit 24 for performing expansion processing of the distributed video data, an audio data expanding circuit 25 for performing expansion processing of the distributed audio data, and a data selecting circuit 26 for synchronously selecting the expanded video data and audio data.

The shown recording and reproducing apparatus also includes an adder 27 for adding together the display information generated by the display information generating circuit 23 and the video data selected by the data selecting circuit 26, a D/A converter 28 for converting the addition output of the adder 27 into an analog signal, a video monitor 30 which is used for monitoring a video signal, D/A converters 29-L and 29-R for converting the left and right channel audio data selected by the data selecting circuit 26 into analog signals, audio monitors 31-L and 31-R which are used for monitoring left and right channel audio signals, an output terminal 32 for the video data, and an output terminal 33 for the audio data.

The operation of the recording and reproducing apparatus having the above-described arrangement shown in FIG. 1 will be described below in the order of a recording operation and a reproduction operation.

First, the recording operation will be described below.

A left (L) channel audio signal and a right (R) channel audio signal which form a stereophonic audio signal are respectively inputted through the audio signal input terminals 1 and 2, and are converted into digital audio signals by the A/D converters 4 and 5, respectively. These digital audio signals are respectively subjected to predetermined processing, such as various kinds of noise reduction and restriction of their dynamic ranges, in the audio signal processing circuits 7 and 8. The thus-processed digital audio signals are subjected to data compression processing in the audio data compressing circuit 10.

As the data compression processing, it is possible to employ, for example, a coding method proposed by MPEG (Moving Picture Expert Group), such as adaptive conversion coding (ATAC, ASPEC) or band division coding (MUSICAM, SB/ADPCM), or vector coding of two right and left channels which are mixed by using a L/R correlation.

In the meantime, a video signal which is inputted through the video signal input terminal 3 is converted into a digital signal by the A/D converter 6 capable of performing higher-speed processing than the A/D converters 4 and 5. The digital video signal is, as required, subjected to signal processing for conversion into signal components which will be described later in the video signal processing circuit 9.

Then, the amount of data of the digital video signal is compressed to approximately one several-tenth (one over several tens) to approximately one several-hundredth (one over several hundreds) in the video data compressing circuit This data compression processing can be realized by appropriately combining various kinds of processing, such as interframe or interfield correlation processing which employs an interframe or interfield image correlation, and motion-vector compensation for reducing image degradation involved in the interframe or interfield correlation processing, and both-side predictive interframe compression executed on the basis of previous and subsequent (past and future) frames taken along a time axis. As one example, according to what is commonly called MPEG-2 which is an MPEG-proposed algorithm, it is possible to ensure a standard image quality approximately equivalent to the image quality of a so-called ½ VTR.

When the data compression processing is completed, the ID data outputted from the ID generating circuit 12 which will be described later and the aforesaid compressed audio data and video data are combined into a data block which constitutes a predetermined memory unit, in the data combining circuit 13. The data block is sequentially stored in the main memory 18. The main memory 18 is a large-capacity solid-state circuit made up of a flash memory, a DRAM, an SRAM or the like, and the memory controller 17 performs control of the memory addresses of the main memory 18, writing to and reading from the main memory 18 and the like. The memory controller 17 is controlled by the system controller 16.

The system controller 16 performs not only control of the aforesaid memory controller 17 but also control of the entire apparatus, such as control for selecting an operation from among recording, reproduction and retrieval. Specifically, when the system controller 16 receives an instruction, such as a recording instruction, a reproduction instruction or a retrieval instruction, inputted by an operation of the operating keys 19, the system controller 16 performs control of the memory controller 17 and simultaneously causes the display device 20 to display the operating status of the apparatus and information, such as a time code indicative of a recording/reproduction time. The system controller 16 also transmits the information, such as the time code, to the memory information generating circuit 15.

The aforesaid time codes are mainly divided into two kinds. The first kind of time code represents information indicative of an elapsed time which passes after the start of the main memory 18 or a video program and the cumulative time of camera photography, and the second kind of time code represents information indicative of the year/month/day and the instant of time of recording or camera photography. To generate the latter kind of time code, the calendar clock generating circuit 14 is provided.

The memory information generating circuit 15 receives data, such as data indicative of the status of storage of information in the main memory 18, from the memory controller 17, and supplies the received data to the ID generating circuit 12 as memory information indicative of the amount of data contained in the information recorded in the main memory 18. The contents of the memory information include, for example, data indicative of the time codes and selected modes for image quality and sound quality, which are based on the information supplied from the system controller 16, the amount of video data or audio data which is based on the information supplied from the memory controller 17 (a data length, in the case of variable length coding), and the value of a starting address of a data storage location in the main memory 18.

The ID generating circuit 12 generates ID data from the memory information and the information supplied from the system controller 16, and supplies the ID data to the data combining circuit 13. The data combining circuit 13 combines the ID data and the compressed audio data and video data into a data block which constitutes a predetermined memory unit. The data block is sequentially stored in the main memory 18 for each ID data. The starting address of each data block stored in the main memory 18 is sequentially written into an ID file set in the main memory 18.

FIGS. 2(a) to 2(d) show an example of the manner of data storage in the main memory 18, the data format of the aforesaid data block and the like.

FIG. 2(a) shows the manner in which ID numbers are generated at intervals of predetermined time $T_0$ along the time axis represented by the horizontal axis.

FIGS. 2(b) to 2(d) show conceptual diagrams of the address space of the main memory 18. As shown in FIG. 2(d), video data and audio data obtained by variable length coding are sequentially stored at predetermined processing intervals after ID data, so that the intervals $T_0$ at which the ID numbers are generated are constant intervals (for example, 1 second).

To make it possible to rapidly access a desired data block during retrieval of video data and audio data, an ID file, such as that shown in FIG. 2(b), is generated which collectively contains addresses indicative of the storage locations of individual data blocks sequentially stored as shown in FIG. 2(c). This ID file is generated in such a way that only the starting addresses of the respective data blocks are orderly stored in an area which is set in advance according to the memory capacity of the main memory 18.

The ID data in each of the data blocks has a fixed length and contains a total of eight kinds of basic information in the example shown in FIG. 2(d). Specifically, the basic information contains the following eight kinds of data: a time code according to the SMPTE (Society of Motion Picture and Television Engineers), data about the selection of modes of image quality and sound quality on the basis of a trade-off with recording time, the starting addresses of AV data (audio data and video data) of variable length and a deleted flag. The deleted flag is used when temporarily stored data is to be erased, and sets the stored data to a recoverable, logical erased state before physical deletion processing and disables normal reproduction of the data.

The audio data in each of the data blocks is formed by compressed audio data which contains left and right channel audio data subjected to compression processing. The video data in each of the data blocks is formed by compressed video data coded by a selected kind of compression method. Although not shown, the audio data may also contain initialization information (audio reset data) for each of the right and left channels, and the video data may also contain an initialization picture (video reset data) based on, for example, intraframe coding.

The video data and the audio data each having the above-described construction are blocked to constitute a data block for each ID block. The data blocks are generated at the constant intervals $T_0$ defined on the time axis.

FIG. 3 shows one example of an input video signal. This example is an input signal which is basically a TV (television) signal according to the NTSC system (525 vertical lines) and has an aspect ratio of 16:9 corresponding to a picture which is long from side to side like a cinematographic picture. If the effective area of such a picture is 94% in each of the horizontal and vertical directions, information for 880×495 pixels is generated at a rate of 30 frames per second, and is supplied to the video signal input terminal 3 of FIG. 1.

This composite video signal is converted into digital data by the A/D converter 6 of FIG. 1, and the digital video signal is, as required, subjected to signal processing for conversion into signal components (for example, luminance Y:color difference R−Y:color difference B−Y=4:2:2) in the video signal processing circuit 9. If the video signal processing circuit 9 quantizes the luminance signal Y of each pixel into an 8-bit digital signal and also quantizes each of the color-difference signals R−Y and B−Y of each pixel into an 8-bit digital signal at a sampling rate of ½, the amount of information processed becomes approximately 700 Gbits for one hour.

Incidentally, the amount of information processed in 48 KHz/16 bit digitization of a stereophonic audio signal becomes approximately 5.5 Gbits per hour, and if the above-described compression processing is applied to the obtained digital signal, the amount of information of video and audio signals becomes approximately 4 Gbits.

The reproduction operation will be described below.

If the reproduction operation is specified through a reproduction key (not shown) contained in the operating keys 19, the system controller 16 displays on the display device 20 a message to the effect that the reproduction operation is being performed. The memory controller 17 controls the memory addresses of the main memory 18 and switching between reading and writing from and to the main memory 18, thereby reading the information signals stored by the aforesaid recording operation from the main memory 18.

The memory controller 17 reads a predetermined amount of information per unit time on the basis of the read ID data. In the case of the aforesaid example, the predetermined amount of information indicates the amount of information which contains video data for thirty frames per second, stereophonic (or two channels of) audio data for one second and ID data for retrieval of the video and audio data.

The three kinds of data are supplied to the data distributing circuit 21 in a mixed state (in the state of serial data). In accordance with this data format, it is also possible to adopt a memory format which enables extension of the main memory 18 or exchange of IC cards or other recording media.

The ID data, the video data and the audio data which have been supplied to the data distributing circuit 21 are distributed to the retrieval information reproducing circuit 22, the video data expanding circuit 24 and the audio data expanding circuit 25, respectively.

Figure 2:
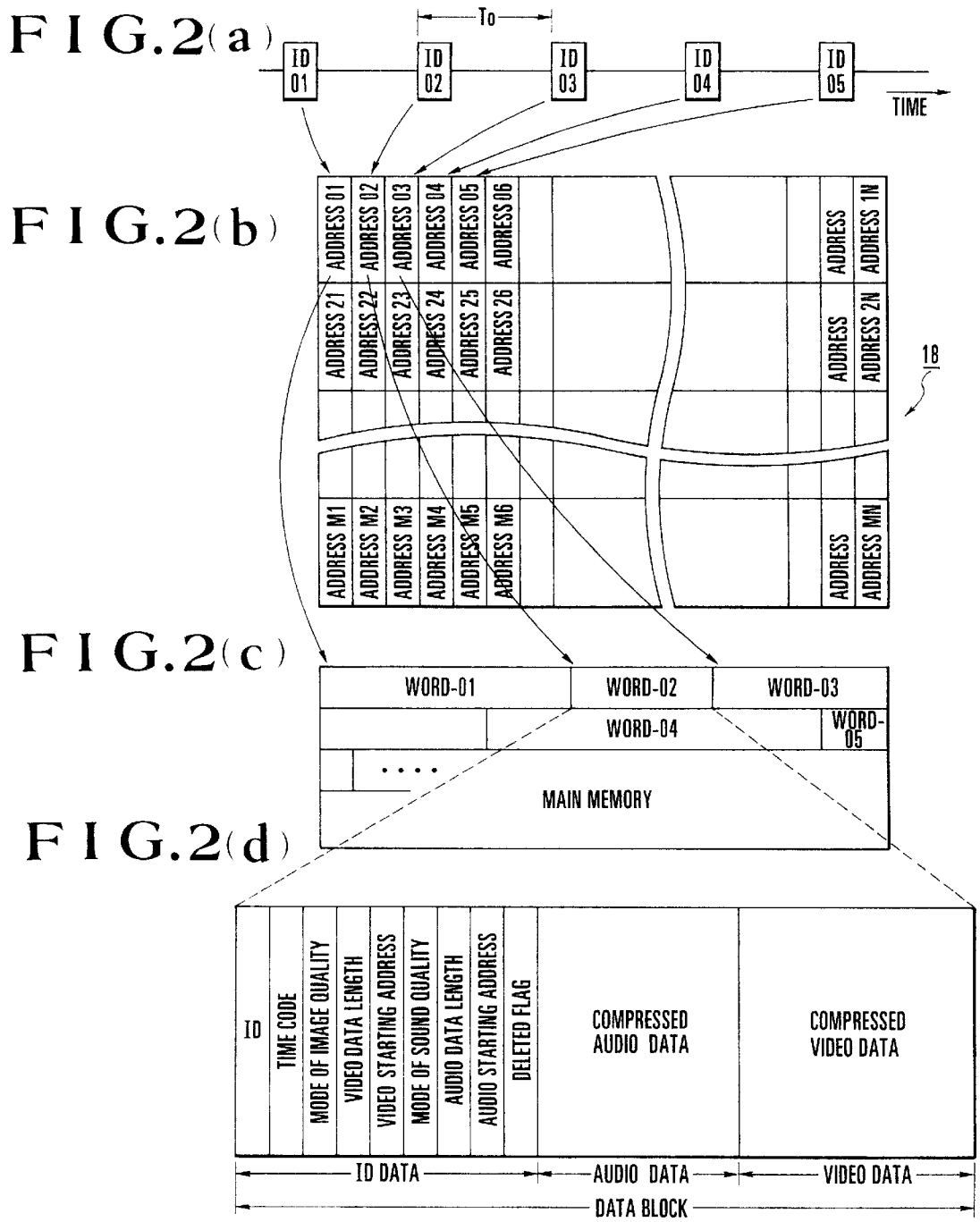
FIGS. 2(a) to 2(d) are data construction views showing the state of storage of data in a main memory.

Regarding the ID data, the retrieval information reproducing circuit 22 detects the eight kinds of basic information shown in FIG. 2(*d*) for each ID, and the display information generating circuit 23 generates display information for the video monitor 30 from the detected information. Then, the display information and video information restored in a manner which will be described later are added together in the adder 27, and the addition output of the adder 27 is converted into a general-purpose analog video signal by the D/A converter 28 and displayed on the video monitor 30.

Regarding the video data, the video data expanding circuit 24 subjects the video data to data expansion processing opposite to the data compression processing executed during recording, thereby reconstructing a video signal equivalent to the video signal inputted during the recording. The reconstructed video signal is supplied via the data selecting circuit 26 to the adder 27 for combining the reconstructed video signal and the display information into a display signal to be displayed on the video monitor 30. The reconstructed video signal is also supplied to the video data output terminal 32.

Regarding the audio data, similarly to the video data, the audio data expanding circuit 25 subjects the audio data to data expansion processing opposite to the data compression processing executed during recording, thereby reconstructing an audio signal equivalent to the audio signal inputted during the recording. The reconstructed audio signal is supplied via the data selecting circuit 26 to the D/A converters 29-L and 29-R for generating audio signals to be reproduced from the audio monitors 31-L and 31-R. The reconstructed audio signal is also supplied to the audio data output terminal 33.

Regarding each of the video and audio data, a deviation due to the delay time required for the processing of the reproduced signal is corrected by using the aforesaid ID data, and the corrected video and audio data are reproduced. Also, the reproduced video and audio signals are outputted from the data selecting circuit 26 in synchronism with the information supplied from the display information generating circuit 23.

Although the construction of the main data (the ID data, the video data and the audio data) and the details of the processing of such data have been described above, a first embodiment of a data file which is adopted for improving the retrievability of data in the present invention will be described below with reference to FIGS. 4 to 7.

A recording and reproducing apparatus according to the first embodiment includes a basic arrangement made up of an AV data file (which makes use of the memory area of a solid-state memory device) 40 for storing main AV data (video data and audio data), a system controller 45 for performing various kinds of control of the apparatus, operating keys 46 for inputting various kinds of instructions to the system controller 45, an information processing circuit 41 for performing data processing in accordance with an instruction supplied from the system controller 45 and an information input/output circuit 42 for performing processing associated with the input and output of information. The recording and reproducing apparatus includes, in addition to the basic arrangement, an ID file 43 for data retrieval and an ID generating circuit 4 for generating the ID file 43.

Figure 4:
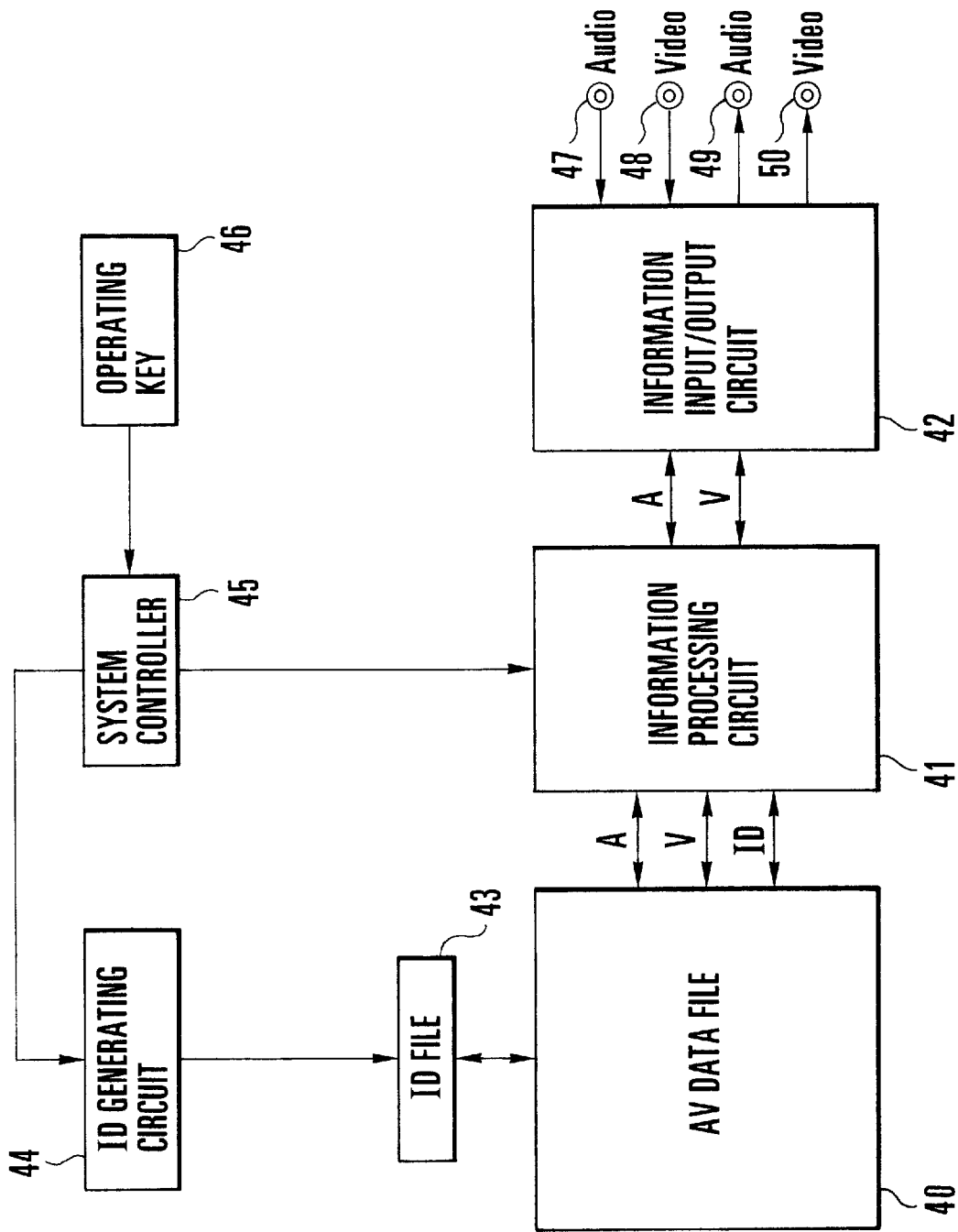
FIG. 4 is a block diagram showing the arrangement of a recording and reproducing apparatus for implementing data retrieval according to a first embodiment.

Incidentally, since the arrangement contained in FIG. 1 is schematically shown in FIG. 4 as the basic arrangement, a description thereof is omitted and only data retrieval using a data file will be referred to in the following description.

The operation of the first embodiment will be described below with illustrative reference to a case where photography using a video camera (not shown) and data retrieval based on ID information are carried out.

First, an operation performed during recording (during photography using a video camera) will be described below.

While video and audio signals are being supplied to the recording and reproducing apparatus from the video camera (not shown) via input terminals 47 and 48 for AV signals, if an instruction to start or end recording is inputted through a photography key (not shown) contained in the operating keys 46, the system controller 45 transmits an instruction to generate ID information or to stop generating ID information to the ID generating circuit 44.

When the ID generating circuit 44 receives such an instruction, the ID generating circuit 44 outputs an instruction to newly generate or update the ID file 43, in accordance with the instruction to start recording. The ID generating circuit 44 also outputs an instruction to stop generating the ID file 43, in accordance with the instruction to end recording. Thus, the ID generating circuit 44 generates or updates the ID file 43 for data retrieval such as that shown in FIG. 5. The starting and ending Nos. shown in FIG. 5 respectively indicate the starting ID number and the ending ID number of a data block in which the AV data recorded from the start of the recording until the end of the recording is stored. The starting and ending ID numbers correspond to the respective ID numbers which are generated at intervals of the predetermined time $T_0$ shown in FIG. 2(a).

In the above-described arrangement, the ID generating circuit 44 generates the ID file 43 which contains the starting ID number and the ending ID number of each recorded AV data, in accordance with an instruction to start or end recording which is inputted from the operating keys 46. However, it is also possible to adopt an arrangement in which information, such as information indicative of the amount of data contained in recorded AV data, is directly written from the AV data file 40 to an empty area of the ID file 43.

A data retrieval operation which is performed during reproduction will be described below with reference to the construction example of the ID file 43 shown in FIG. 5.

During retrieval of AV data, the storage addresses of the AV data are extracted by accessing the ID file shown in FIG. 2(b) by employing the starting ID number and the ending ID number which are obtained by making a search in the ID file 43, and the extracted storage addresses are read out. Then, the AV data file 40 is accessed by using this address information, thereby reproducing desired video and audio signals. Accordingly, it is possible to retrieve data in a short time and effect search reproduction.

Figure 6:
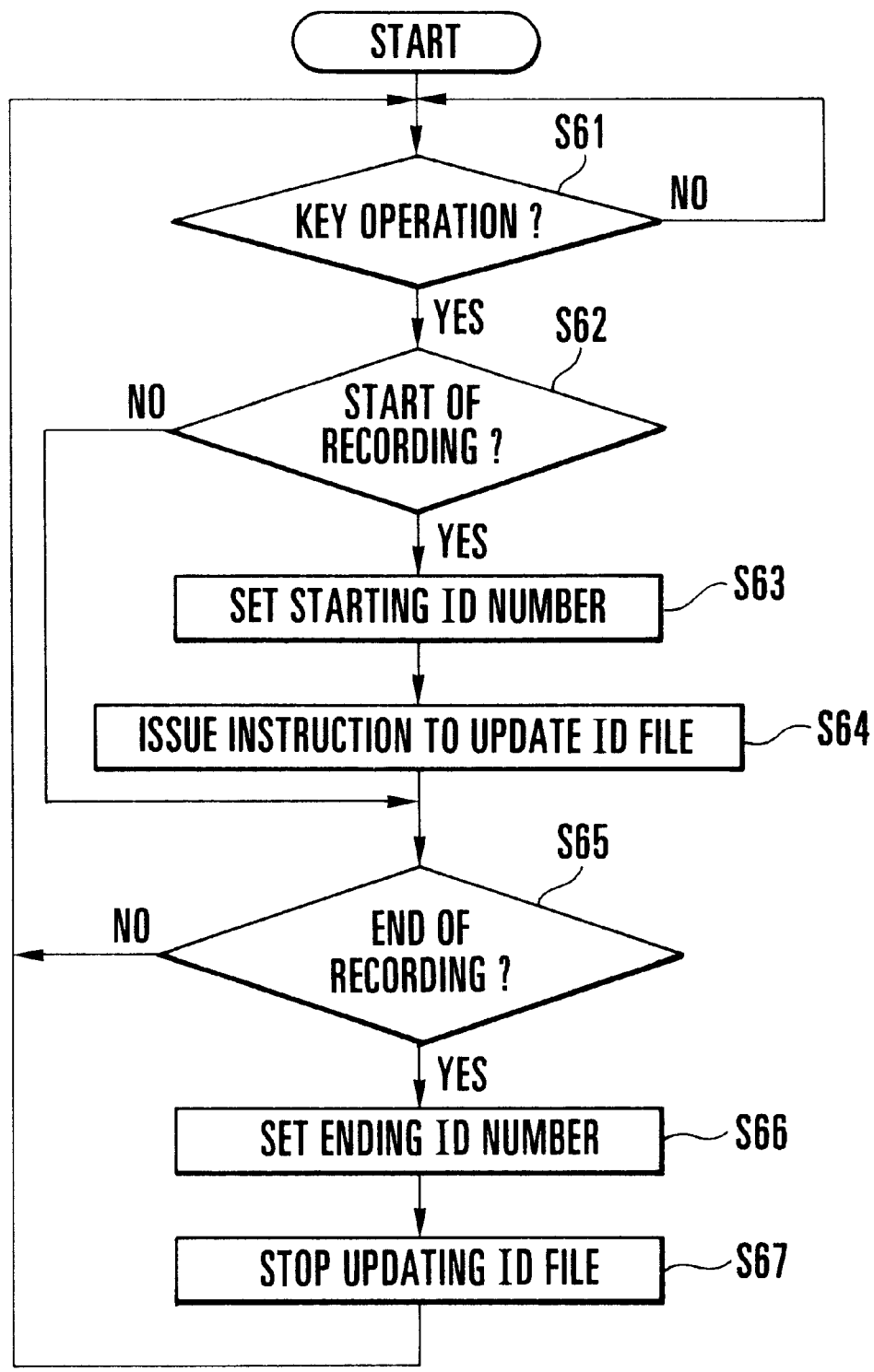
FIG. 6 is a flowchart showing the operational sequence of a recording operation.
Figure 7:
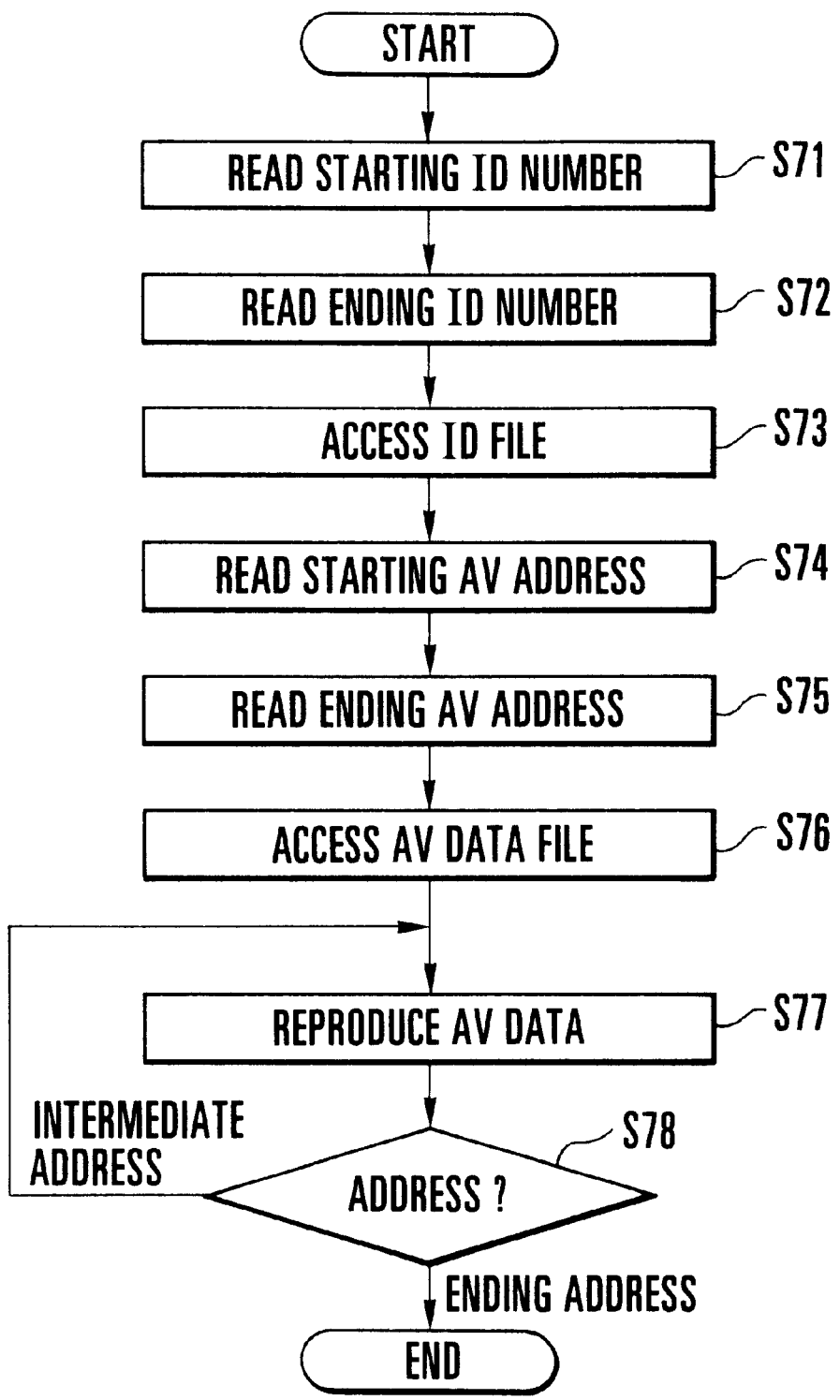
FIG. 7 is a flowchart showing the operational sequence of a search reproduction operation.

The operational sequences of the above-described recording and search reproduction are shown in the flowcharts of FIGS. 6 and 7, respectively.

The recording operation will first be described with reference to FIG. 6. If it is determined in Steps S61 and S62 that an instruction to start recording of AV data has been inputted from the operating keys 46 shown in FIG. 4, the process proceeds to Step S63, in which a starting ID number is set which corresponds to the position in the AV data file 40 at which recording of the AV data is to be started. Subsequently, after an instruction to update the ID file 43 is issued in Step S64, the recording of the AV data is continued until it is determined in Step S65 that an instruction to end the current recording has been inputted from the operating keys 46. During this recording operation, the ID number is incremented according to the number of data blocks of the recorded AV data. If an instruction to end the recording is detected in Step S65, the ID number obtained at that time is set as an ending ID number in Step S66. In Step S67, the processing of updating the ID file 43 is brought to an end.

In the case of search reproduction, as shown in FIG. 7, in Steps S71 and S72, a search is made in the ID file 43, whereby a starting ID number and an ending ID number which were set during the recording of AV data are read from the ID file 43. In Steps S73 to S75, the read ID numbers are employed to access the ID file shown in FIG. 2(b), whereby the starting address and the ending address of the addresses at which the AV data is stored are extracted and read out. In Step S76, this address information is employed to access the AV data file 40, and in Step S77 the AV data is reproduced. Then, if it is determined in Step S78 that the AV data has been reproduced up to the ending address, the search reproduction is brought to an end.

As is apparent from the above description, in accordance with the first embodiment, AV data is recorded in a solid-state memory device in units of data blocks, and a retrieval data file associated with retrieval data of fixed length is constructed separately from the AV data of variable length. Since the retrieval data file is employed to perform retrieval of the AV data by means of address management, it is possible to increase the speed of the retrieval performed during search reproduction and it is also possible to efficiently utilize a limited memory area.

A second embodiment of the data file which is adopted for improving the retrievability of data will be described below with reference to FIGS. 8 to 11.

Figure 8:
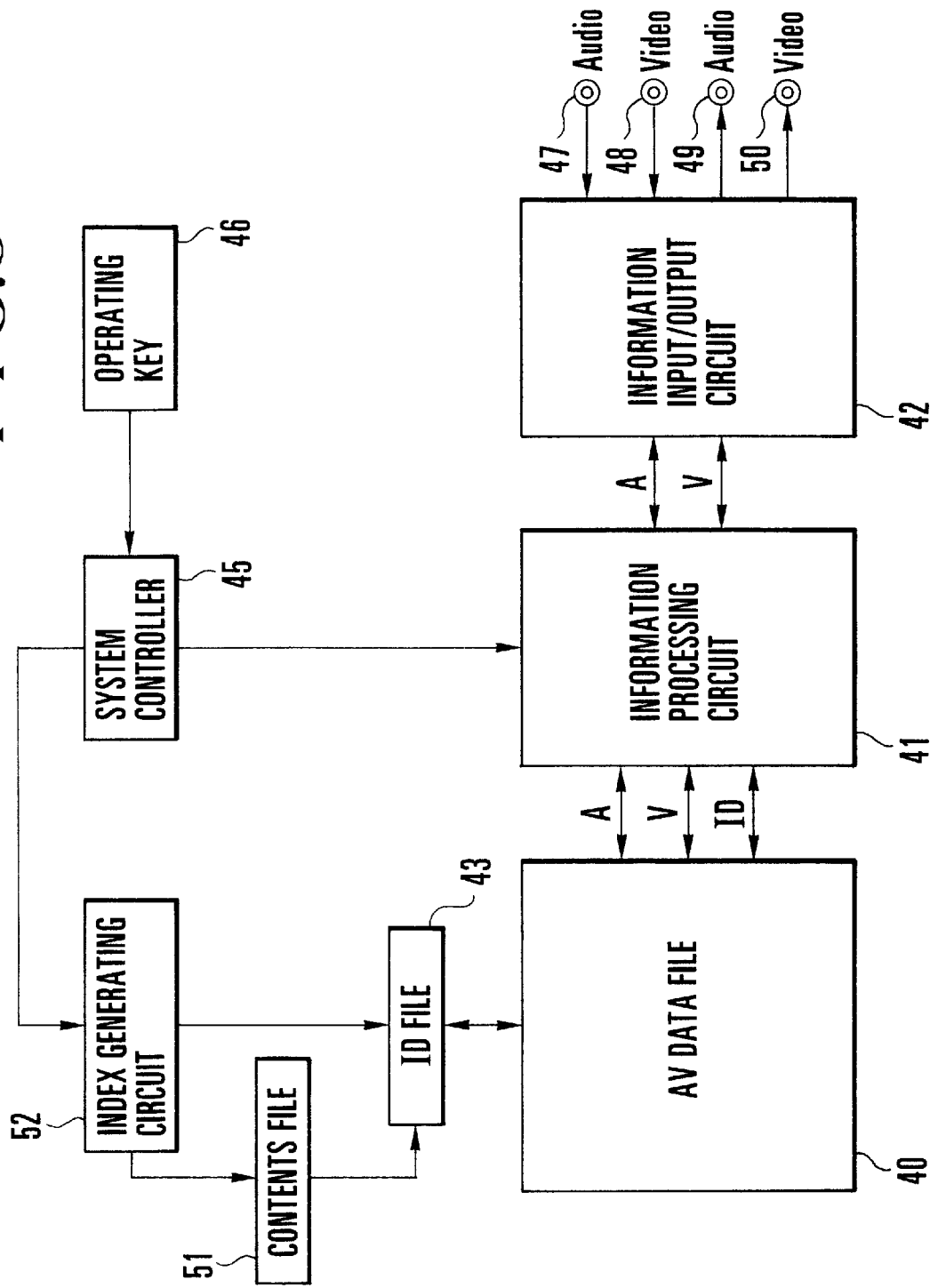
FIG. 8 is a block diagram showing the arrangement of a recording and reproducing apparatus for implementing data retrieval according to a second embodiment.

FIG. 8 is a block diagram showing the arrangement of a recording and reproducing apparatus for implementing data retrieval according to the second embodiment. In FIG. 8, identical reference numerals are used to denote portions corresponding to those of the aforesaid first embodiment shown in FIG. 4, and a detailed description thereof is omitted.

First, the recording operation of the apparatus will be described below.

An index generating circuit 52 generates index information for data retrieval in accordance with an instruction which is issued from the system controller 45 in accordance with an instruction to start or end recording inputted from the operating keys 46.

The index information corresponds to, for example, the head of a chapter or a paragraph in a book or the head of a movement or a measure in a musical work. In the second embodiment, as one example, information indicative of the start and end of a photographic recording is allocated to a "subhead", and information indicative of power on/off is allocated to a "head". Further, date information provided by the calendar clock generating circuit 14 shown in FIG. 1 is allocated to a "banner headline". It is detected whether a variation has occurred in each of the information, and if it is detected that a variation has occurred in any of the information, a corresponding value is updated. Thus, the index information can be automatically generated by a simple method. If more complex index information is to be generated, index information which has as complex a form as desired can be generated, as by manually generating the index information by using a setting key (not shown) or the like.

A construction example of the aforesaid index information is shown in FIG. 9.

In the example of FIG. 9, the index information can be set at levels I to IV, and information indicative of the aforesaid "banner headline", "head" and "subhead" are respectively assigned to the levels I to III. Since the level IV is not used, zeros are assigned to the levels IV of all the index information.

Specifically, each time it is detected that an instruction to start or end a photographic recording has been inputted from the operating keys 46 shown in FIG. 8, the information of level III is updated by one. Also, each time a power supply (not shown) is turned on or off, the information of level II is updated by one, whereas the information of level III is reset. Also, each time it is detected from the aforesaid date information that the date has changed, the information of level I is updated by one, whereas the information of levels II and III are reset. The thus-obtained minimum level unit constitutes an index word.

The index generating circuit 52 registers the content titles of the respective indexes in a contents file 51, as required.

The content titles are names representative of, for example, the contents of individual recorded AV data, and if such a title is assigned to each index, a retriever can easily grasp the information content of each recorded AV data during a later data retrieval. The retriever can assign a desired title to each index by means of an operating key (not shown). Of course, it is not necessary to register content titles for all the indexes, and there may be indexes the content titles of which are in blank.

The index generating circuit 52 outputs an instruction to generate or stop generating the ID file 43, in accordance with an instruction supplied from the system controller 45, and the ID file 43 is generated in a manner similar to that carried out in the first embodiment.

The starting and ending ID numbers of each recorded data are recorded in the ID file 43 in a manner similar to that carried out in the first embodiment.

The data retrieval operation performed during reproduction will be described below with reference to the construction example of the data file shown in FIG. 9.

First of all, when a retriever specifies a desired index level from among the levels I to III of the index information, a search is made for a variation point of the desired index level. The information indicated by the thus-detected index words are displayed on a display (not shown) via a video output terminal 50, and the retriever is instructed to select, from among the detected indexes, an index corresponding to desired data to be retrieved. The search made at the desired index level is such that, for example, if the retriever desires to roughly grasp the entire memory, the retriever makes a search only at the level I, whereas if a detailed retrieval is needed, the retriever makes a search so that an information variation point at the level III can be checked.

If a content title corresponding to the detected index is registered in the contents file 51, the content title is displayed on the display. Accordingly, the retriever can easily select an index corresponding to data to be retrieved, on the basis of the displayed content title. Also, if no content title is registered, an ID number corresponding to the information indicated by each index word is read from the ID file 43 and the ID file shown in FIG. 2(b) is accessed. The storage addresses of AV data are extracted and read from the ID file, and the AV data file 40 can be accessed on the basis of the read address information so that video information can be displayed on the display.

If the retriever selects the desired index, a starting ID number and an ending ID number corresponding to the selected index word information are read from the ID file 43. In a manner similar to that carried out in the first embodiment, the AV data file 40 is accessed by employing address information indicated by the retrieval data obtained by accessing the ID file shown in FIG. 2(b), whereby search reproduction of AV data is performed.

Figure 10:
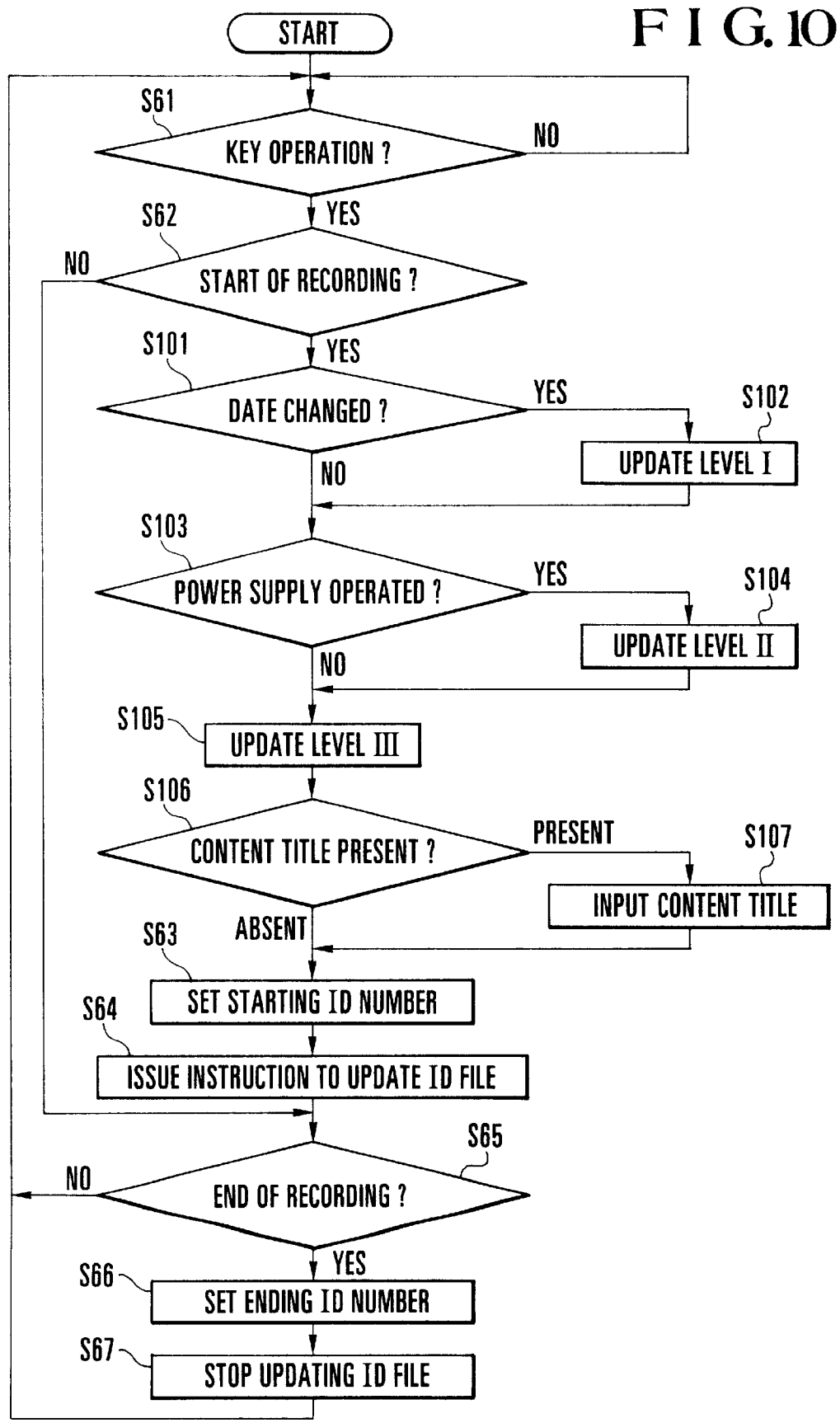
FIG. 10 is a flowchart showing the operational sequence of a recording operation.
Figure 11:
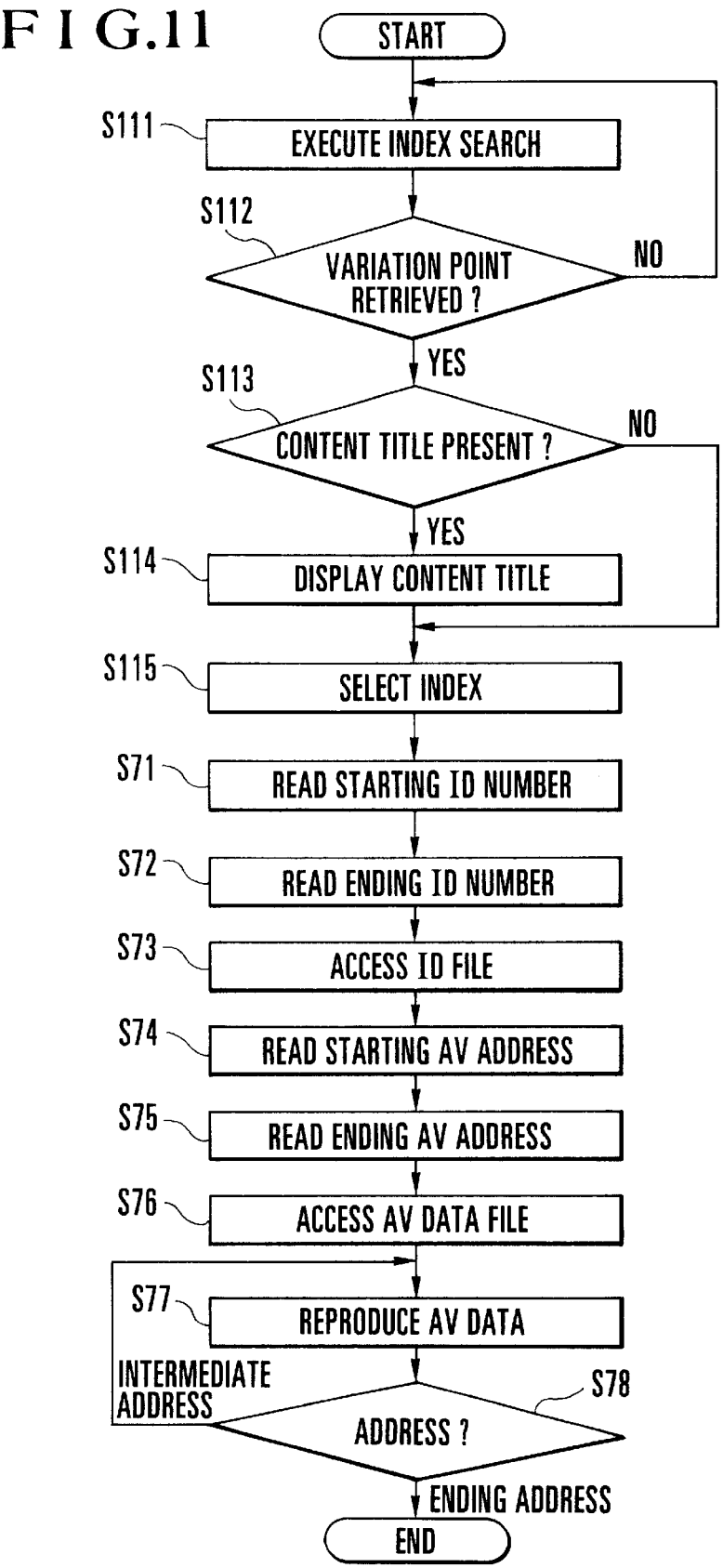
FIG. 11 is a flowchart showing the operational sequence of a search reproduction operation.

FIG. 10 is a flowchart showing the above-described data-file generating operation performed during recording. FIG. 11 is a flowchart showing a data retrieval operation performed during reproduction. In FIGS. 10 and 11, identical reference numerals are used to denote operation steps similar to those of the flowcharts shown in FIGS. 6 and 7.

In FIG. 10 which shows the data-file generating operation performed during recording, if it is determined in Steps S61 and S62 that an instruction to start recording has been inputted from the operating keys 46 of FIG. 8, the process proceeds to Step S101. In Steps S101–S105, an information content at the level I, II or III is updated in accordance with the presence or absence of a variation in the "banner headline", "head" or "subhead" information described above, thereby generating index information. If content titles are to be registered in the contents file 51, registration is executed in Steps S106 and S107. Then, in Steps S63–S67, the ID file 43 is generated in a manner similar to that carried out in the first embodiment.

In the case of the search reproduction, as shown in FIG. 11, a search is made for a variation point of a desired index level in Step S111 and S112, thereby detecting index word information. If a content title corresponding to the detected index word information is registered in the contents file 51, the content title is displayed on the display (not shown) in Steps S113 and S114. Then, in Step S115, the retriever selects an index corresponding to desired data to be retrieved. Subsequently, in Steps S71 to S78, a search reproduction similar to that carried out in the first embodiment is executed on the basis of the selected index in a manner similar to that executed in the first embodiment.

As is apparent from the above description, in accordance with a second embodiment, during the search reproduction, it is possible to select data to be retrieved, on the basis of visually displayed index word information. Accordingly, as compared with the first embodiment, it is possible to easily select and retrieve only desired data, whereby it is possible to realize retrieval of greatly improved operability.

A third embodiment of the data file which is adopted for improving the retrievability of data will be described below with reference to FIGS. 12 to 15.

FIG. 12 is a block diagram showing the arrangement of a recording and reproducing apparatus for implementing data retrieval according to the third embodiment. In FIG. 12 identical reference numerals are used to denote portions corresponding to those shown in FIG. 8, and a detailed description thereof is omitted.

Similarly to the case of the second embodiment described above, an index generating circuit 54 generates index information and the ID file 43 in accordance with an instruction which is issued from the system controller 45 in accordance with an instruction to start or end recording which is inputted from the operating keys 46.

In the case of the third embodiment, the index generating circuit 54 further generates a time file 53 for date retrieval. The time file 53 is provided so that an instant of time at which an instruction to generate the index information was issued is stored as time data in association with the ID file 43 which corresponds to the storage location of AV data which is being recorded. Accordingly, if a data retrieval which will be described later is performed by using the time file 53, it is possible to rapidly perform a retrieval operation based on an instant of time.

As described previously, since the ID number which constitutes the ID file 43 is updated at intervals of the constant time $T_0$, if the instant of time at which recording was started and the instant of time at which the recording was ended are known, it is possible to correlate an intermediate arbitrary instant of time with the storage location of AV data.

FIG. 13 shows a construction example of the index information, the ID file 43 and the time file 53. Time information indicative of the year/month/day and hour/minute/second of recording are recorded in the time file 53.

If, for example, an image photographed in "the morning of summer" is to be reproduced as a video image by using such data files, a search is made in the time file 53 by using the retrieval condition expressions of ($0701 \leq$ month and day $\leq 0831$) and (time $\leq 09$). Thus, the portions "111" to "115" are extracted from the index information. Then, the ID numbers "0" and "89" which correspond to the indexes "111" to "115" are obtained by making a search in the ID file 43, and the ID numbers "0" and "89" are employed to access the ID file shown in FIG. 2(*b*), whereby the storage addresses of the AV data are read out. The AV data file 40 is accessed on the basis of the read address information, whereby a desired portion can be search-reproduced.

Figure 14:
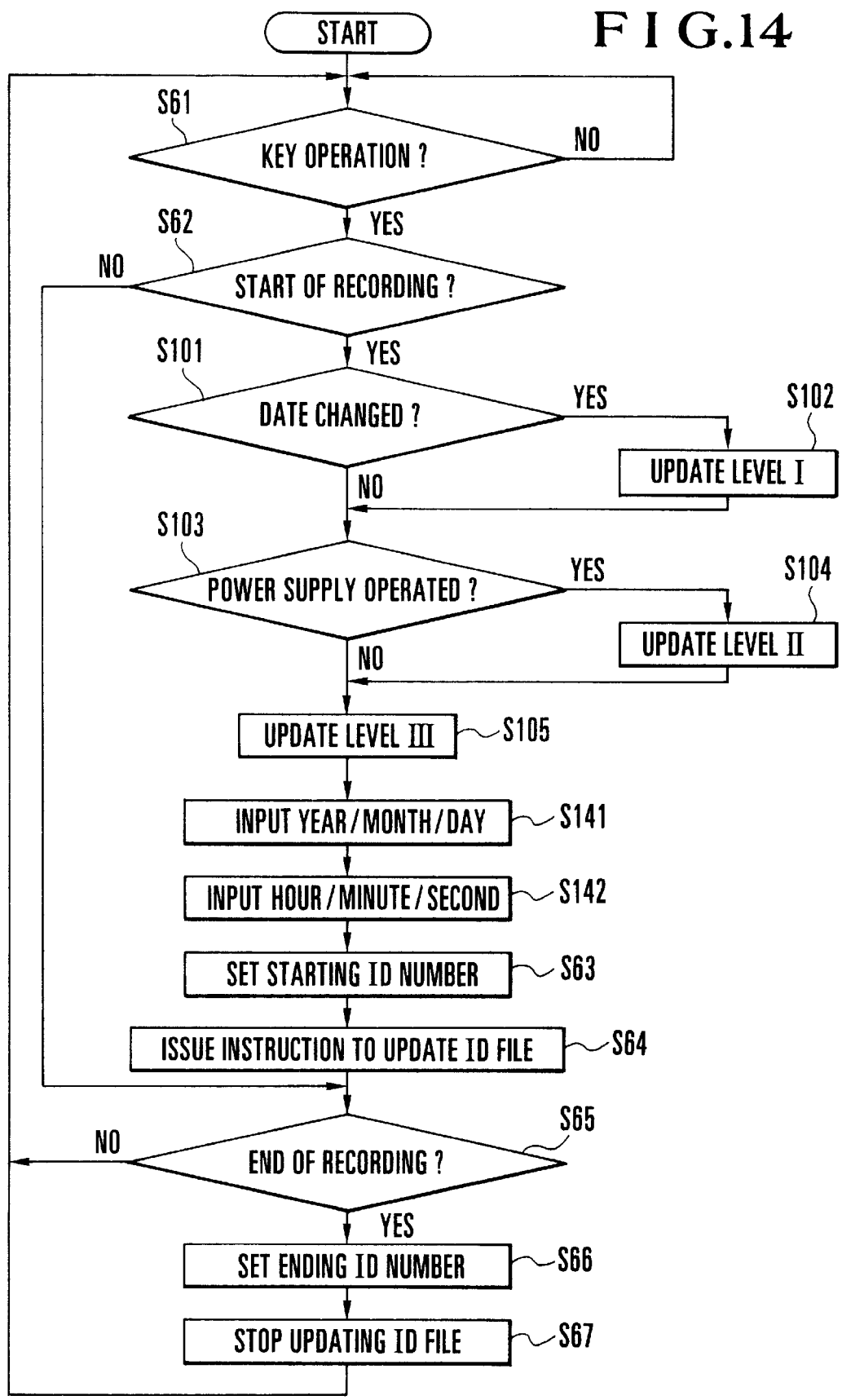
FIG. 14 is a flowchart showing the operational sequence of a recording operation.
Figure 15:
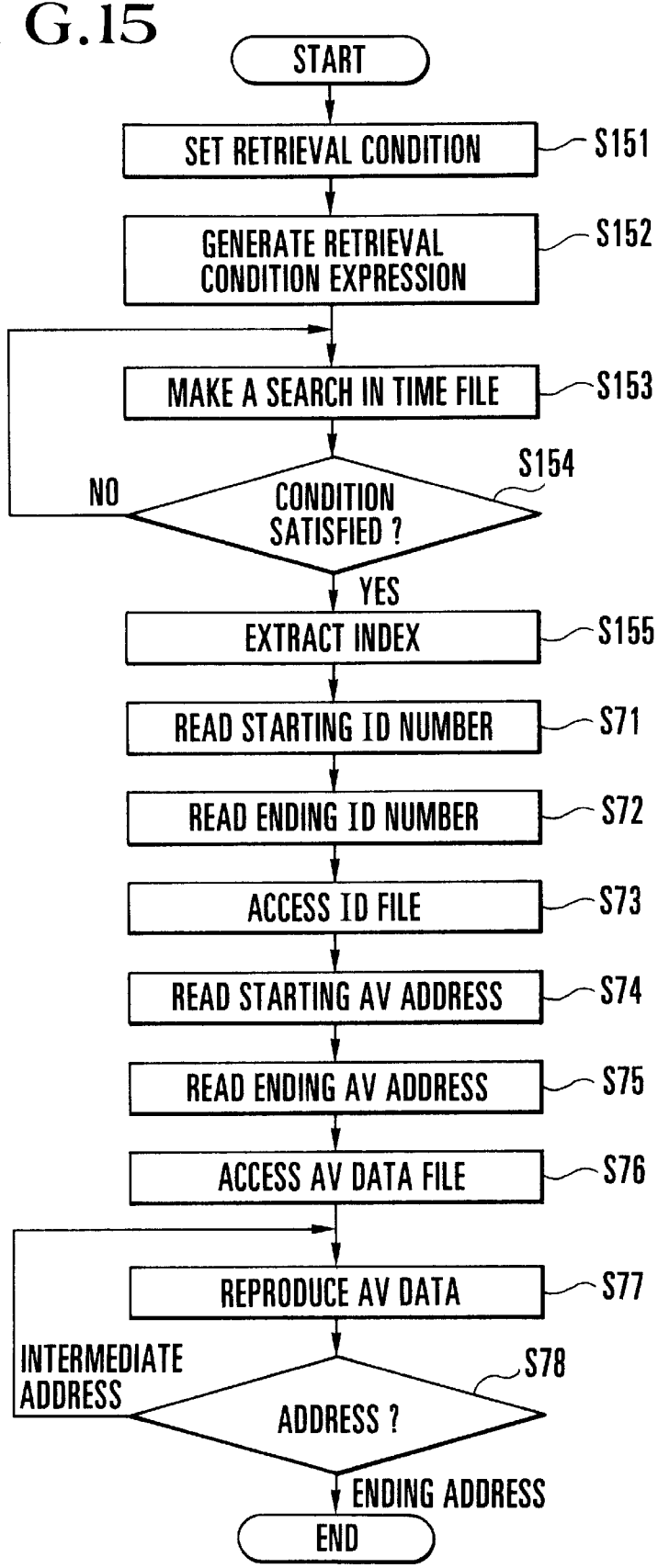
FIG. 15 is a flowchart showing the operational sequence of a search reproduction operation.

FIGS. 14 and 15 are flowcharts respectively showing the operation of generating the above-described data files and the operation of retrieving data from the data files. In FIGS. 4 and 15, identical reference numerals are used to denote blocks the operations of which are similar to those of the corresponding blocks provided in the flowcharts shown in FIGS. 10 and 11.

During photographic recording, the flowchart shown in FIG. 14 is executed. In Steps S61 and S62 as well as Steps S101 to S105, index information is generated in accordance with an instruction to start recording, in a manner similar to that described above in connection with the second embodiment. Then, in Steps S141 and S142, the information content of the time file 53 is updated on the basis of the time information obtained when the index information was generated. Then, in Steps S63 to S67, the ID file 43 is generated in a manner similar to that described above in connection with the first embodiment.

During search reproduction, the flowchart shown in FIG. 14 is executed. In Steps S151 and S152, a desired retrieval condition expression is generated. In Steps S153 to S155, index information which satisfies this retrieval condition expression is extracted by making a search in the time file 53. Then, a starting ID number and an ending ID number which correspond to the extracted index information are read in Steps S71 and S72, respectively. Then, in Steps S71 and S72, search reproduction similar to the search reproduction described above in connection with the first embodiment is executed.

As is apparent from the above description, in accordance with the third embodiment, during search reproduction, since it is possible to retrieve only data which satisfies a desired retrieval condition, only desired data to be reproduced can be retrieved in a short time compared to the first embodiment, so that the efficiency of retrieval can be improved to a further extent.

As is apparent from the above detailed description, in accordance with each of the embodiments described above, a solid-state memory device is employed as an information recording medium, and video information and audio information as well as retrieval information for retrieval of the aforesaid video information and audio information are recorded at intervals of predetermined time in such a manner as to form individual predetermined memory units by correlating the video and audio information with the retrieval information. Accordingly, it is possible to perform recording and reproduction of the video information and the audio information without using any mechanical component, so that it is possible to shorten the time which has heretofore been required to transport a recording medium, whereby retrieval can be effected in a short time. In addition, it is possible to prevent the reliability of data from being lowered by the recording medium undergoing a mechanical damage or the like. Accordingly, it is possible to provide a recording and reproducing apparatus having excellent information retrievability.

In particular, since retrieval information is constructed as information of fixed length and is recorded in a file which can be managed separately from video and audio information, the amount of data to be recorded can be reduced so that a limited memory area can be efficiently utilized. Accordingly, it is possible to increase the recording time of each of the video and audio information, and the retrievability of the information can be improved to a further extent.

Also, during search reproduction, since data to be retrieved can be selected on the basis of visually displayed index word information, it is possible to easily select and retrieve desired data. Accordingly, it is possible to effect retrieval of superior operability.

Further, during search reproduction, since only data which satisfies a desired retrieval condition is retrieved, only desired data to be reproduced can be retrieved in a short time. Accordingly, it is possible to improve the efficiency of retrieval to a further extent.

A fourth embodiment of the data file which is adopted for improving the retrievability of data in the present invention will be described below with reference to FIGS. 16 to 19.

Figure 16:
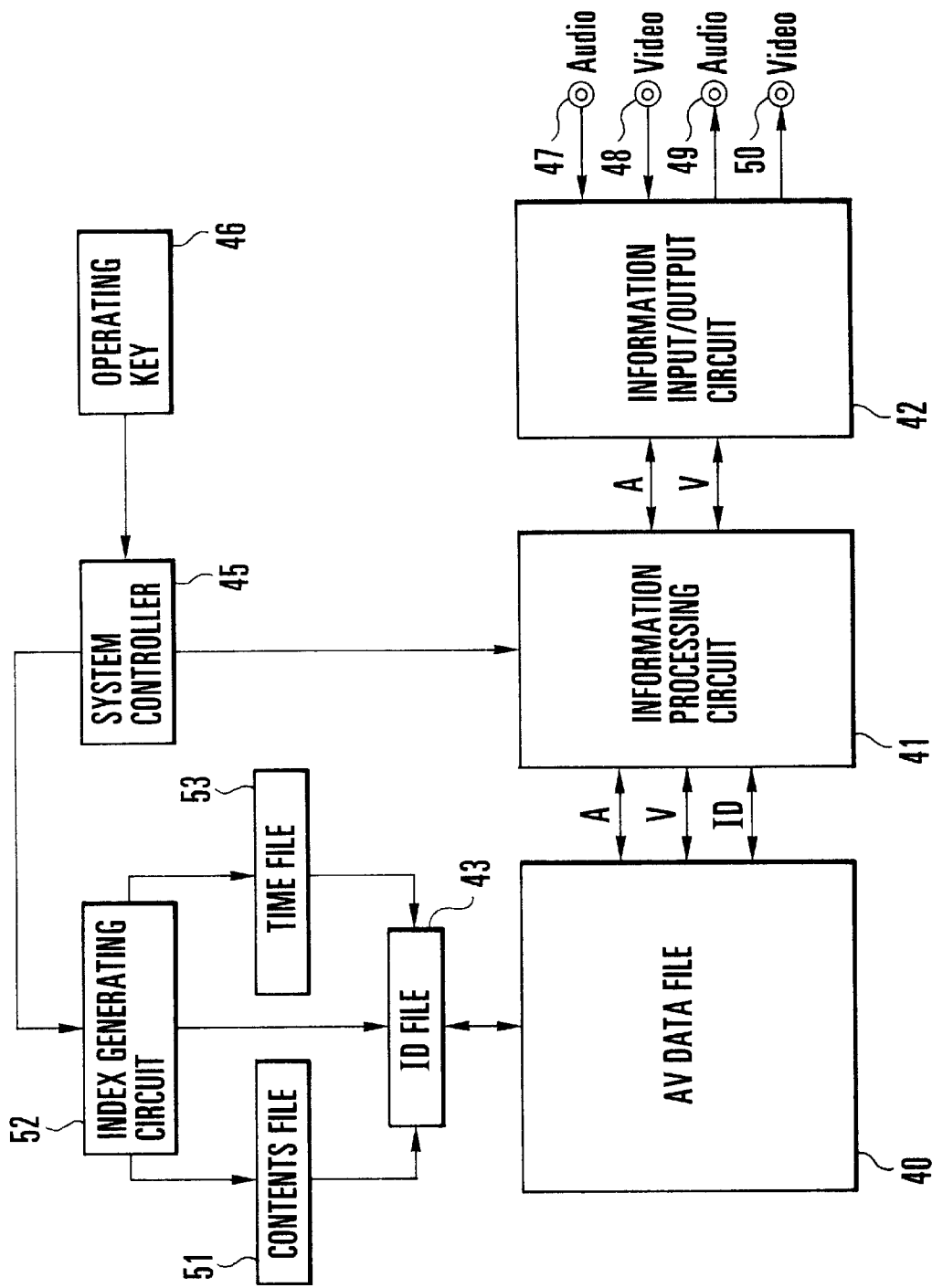
FIG. 16 is a block diagram showing the arrangement of a recording and reproducing apparatus for realizing an improvement in data retrievability.

As shown in FIG. 16, a recording and reproducing apparatus according to the fourth embodiment includes a basic arrangement made up of the AV data file (which makes use of the memory area of a solid-state memory device) 40 for storing main AV data (video data and audio data), the system controller 45 for performing various kinds of control of the apparatus, the operating keys 46 for inputting various kinds of instructions to the system controller 45, the information processing circuit 41 for performing data processing in accordance with an instruction supplied from the system controller 45 and the information input/output circuit 42 for performing processing associated with the input and output of information. The recording and reproducing apparatus includes, in addition to the basic arrangement, the ID file 43, the time file 53 and the contents file 51 all of which are used as files for data retrieval, as well as the index generating circuit 52 for generating the files 43, 53 and 51 for data retrieval.

Incidentally, since the arrangement contained in FIG. 1 is schematically shown in FIG. 16 as the basic arrangement, a description thereof is omitted and only data retrieval using a data file will be referred to in the following description.

The operation of the fourth embodiment will be described below with illustrative reference to a case where photography using a video camera (not shown) and data retrieval based on ID information automatically generated during such photography are carried out.

First, an operation performed during recording (during photography using a video camera) will be described below.

While video and audio signals are being supplied to the recording and reproducing apparatus from the video camera (not shown) via the input terminals 47 and 48 for AV signals, if an instruction to start or end recording is inputted through a photography key (not shown) contained in the operating keys 46, the system controller 45 transmits an instruction to generate index information to the index generating circuit 52. When the index generating circuit 52 receives such an instruction, the index generating circuit 52 generates or updates index information and the three data files 43, 51 and 53 for data retrieval.

The index information corresponds to, for example, the head of a chapter or a paragraph in a book or the head of a movement or a measure in a musical work. In the fourth embodiment, as one example, information indicative of the start and end of a photographic recording is allocated to a "subhead", and information indicative of power on/off is allocated to a "head". Further, date information provided by the calendar clock generating circuit 14 shown in FIG. 1 is allocated to a "banner headline". It is detected whether a variation has occurred in each of the information, and if it is detected that a variation has occurred in any of the information, a corresponding value is updated. Thus, the index information can be automatically generated by a simple method. If more complex index information is to be generated, index information which has as complex a form as desired can be generated, as by manually generating the index information by using a setting key (not shown) or the like.

One of the retrieval data files is the ID file 43. The index generating circuit 52 outputs an instruction to newly generate or update the ID file 43, in accordance with an instruction to end recording which is inputted from the operating keys 46. The index generating circuit 52 also outputs an instruction to stop generating the ID file 43, in accordance with an instruction to terminate photography. Thus, the index generating circuit 52 generates or updates the ID file 43 such as that shown in FIG. 17.

The starting and ending Nos. shown in FIG. 17 respectively indicate the starting ID number and the ending ID number of a data block in which the AV data recorded from the start of the recording until the end of the recording is stored. The starting and ending ID numbers correspond to the respective ID numbers which are generated at intervals of the predetermined time $T_0$ shown in FIG. 2(a).

In the above-described arrangement, the index generating circuit 52 generates the ID file 43 in accordance with an instruction to start or end recording which is inputted from the operating keys 46. However, it is also possible to adopt an arrangement in which information, such as information indicative of the amount of data contained in recorded AV data, is directly written from the AV data file 40 to an empty area of the ID file 43.

Another one of the retrieval data files is the time file 53. The time file 53 is provided so that an instant of time at which an instruction to generate the index information was issued is stored as time data in association with the ID file 43 which corresponds to the storage location of AV data which is being recorded. Accordingly, if a data retrieval which will be described later is performed by using the time file 53, it is possible to rapidly perform a retrieval operation based on an instant of time.

As described previously, since the ID number which constitutes the ID file 43 is updated at intervals of the constant time $T_0$, if the instant of time at which recording was started and the instant of time at which the recording was ended are known, it is possible to correlate an intermediate arbitrary instant of time with the storage location of AV data.

The other one of the retrieval data files is the contents file 51. The index generating circuit 52 registers the content titles of the respective indexes in the contents file 51, as required. The content titles are names representative of, for example, the contents of individual recorded AV data, and if such a title is assigned to each index, a retriever can easily grasp the information content of each recorded AV data during a later data retrieval. The retriever can assign a desired title to each index by means of an operating key (not shown). Of course, it is not necessary to register content titles for all the indexes, and there may be indexes the content titles of which are in blank.

A construction example of the aforesaid index information, the ID file 43, the time file 53 and the contents file 51 is shown in FIG. 17.

In the example of FIG. 17, the index information can be set at levels I to IV, and information indicative of the aforesaid "banner headline", "head" and "subhead" are respectively assigned to the levels I to III. Since the level IV is not used, zeros are assigned to the levels IV of all the index information.

Specifically, each time it is detected that an instruction to start or end a photographic recording has been inputted from the operating key 46 shown in FIG. 16, the information of level III is updated by one. Also, each time a power supply (not shown) is turned on or off, the information of level II is updated by one, whereas the information of level III is reset. Also, each time it is detected from the aforesaid date information that the date has changed, the information of level I is updated by one, whereas the information of levels II and III are reset. The thus-obtained minimum level unit constitutes an index word.

As described previously, starting and ending Nos. are recorded in the ID file 43, and time information indicative of the year/month/day and hour/minute/second of the start of recording are recorded in the time file 53. Also, desired content titles are recorded in the contents file 51 by a retriever, as required.

A retrieval operation performed during reproduction will be described below with reference to the construction example of the index information, the ID file 43, the time file 53 and the contents file 51 shown in FIG. 17.

If AV data is to be retrieved by using the time file 53, for example if an image recorded in "the morning of summer" is to be reproduced as a video image, a search is made in the time file 53 by using the retrieval condition expressions of ($0701 \leq$ month and day $\leq 0831$) and (time $\leq 09$). Thus, the portions "111" to "115" are extracted from the index information.

Then, the ID numbers "0" and "89" which correspond to the indexes "111" to "115" are obtained by making a search in the ID file 43, and the ID numbers "0" and "89" are employed to access the ID file shown in FIG. 2(b), whereby the storage addresses of the AV data are read out. The AV data file 40 is accessed on the basis of the read address information, whereby a desired portion can be search-reproduced.

If AV data is to be retrieved by using the contents file 51, the retriever first specifies a desired index level from among the levels I to III of the index information, and a search is made for a variation point of the desired index level. The information indicated by the thus-detected index words are displayed on a display (not shown) via the video output terminal 48 of FIG. 16, and the retriever is instructed to select, from among the detected indexes, an index corresponding to desired data to be retrieved. The search made at the desired index level is such that, for example, if the retriever desires to roughly grasp the entire memory, the retriever makes a search only at the level I, whereas if a detailed retrieval is needed, the retriever makes a search so that an information variation point at the level III can be checked.

If a content title corresponding to the detected index is registered in the contents file 51, the content title is displayed on the display. Accordingly, the retriever can easily select an index corresponding to data to be retrieved, on the basis of the displayed content title. Also, if no content title is registered, an ID number corresponding to the information indicated by each index word is read from the ID file 43 and the ID file shown in FIG. 2(b) is accessed. The storage addresses of AV data are extracted and read from the ID file, and the AV data file 40 is accessed on the basis of the read address information so that video information can be displayed on the display.

If the retriever selects the desired index, a starting ID number and an ending ID number corresponding to the selected index word information are read from the ID file 43. The storage addresses of the AV data are extracted by accessing the ID file shown in FIG. 2(*b*) by employing the starting ID number and the ending ID number, and the extracted storage addresses are read out. Then, the AV data file 40 is accessed by using this address information, thereby reproducing desired video and audio signals. Accordingly, it is possible to retrieve data in a short time and effect search reproduction.

Figure 18:
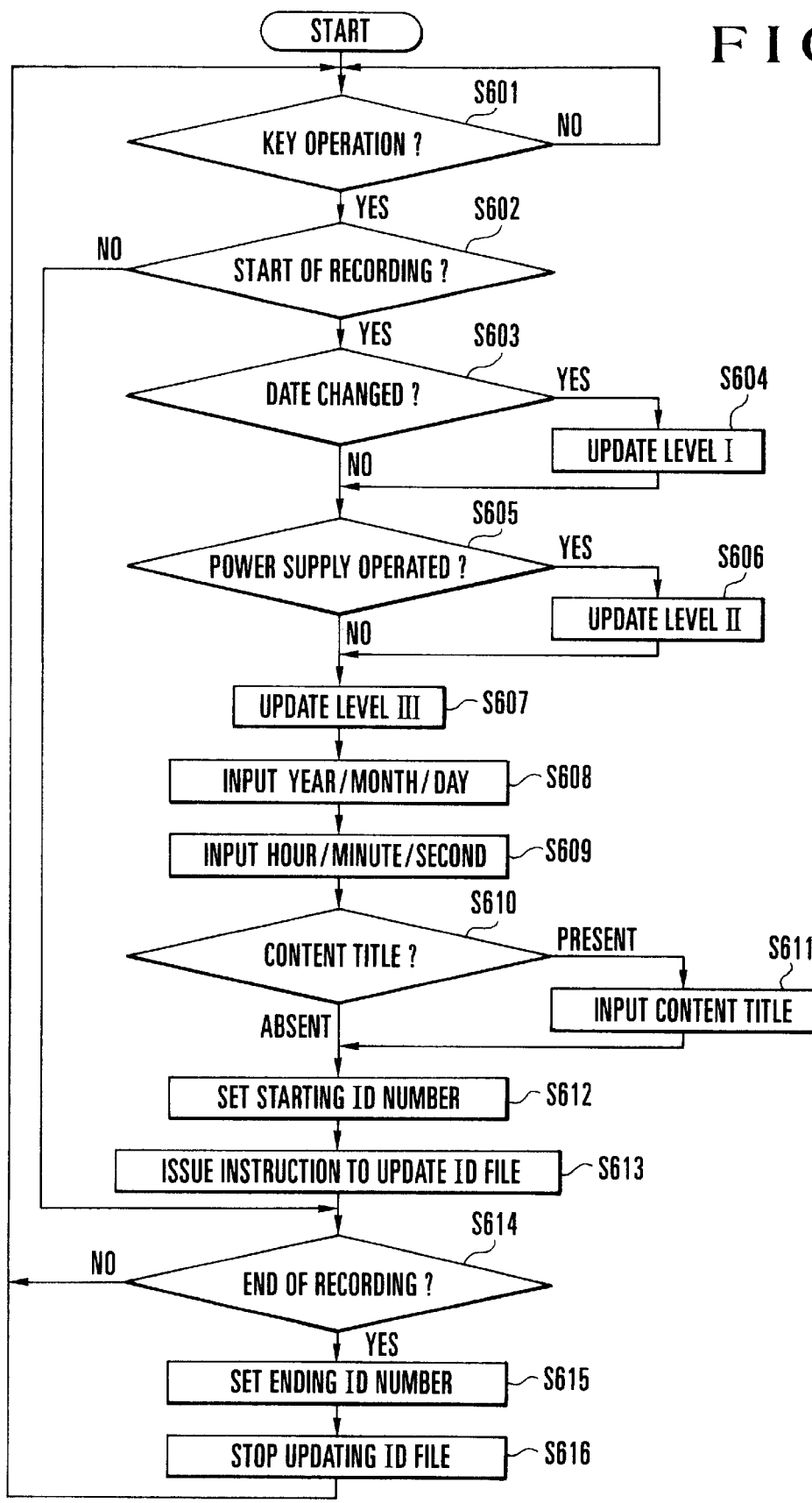
FIG. 18 is a flowchart showing the operational sequence of a recording operation.
Figure 19:
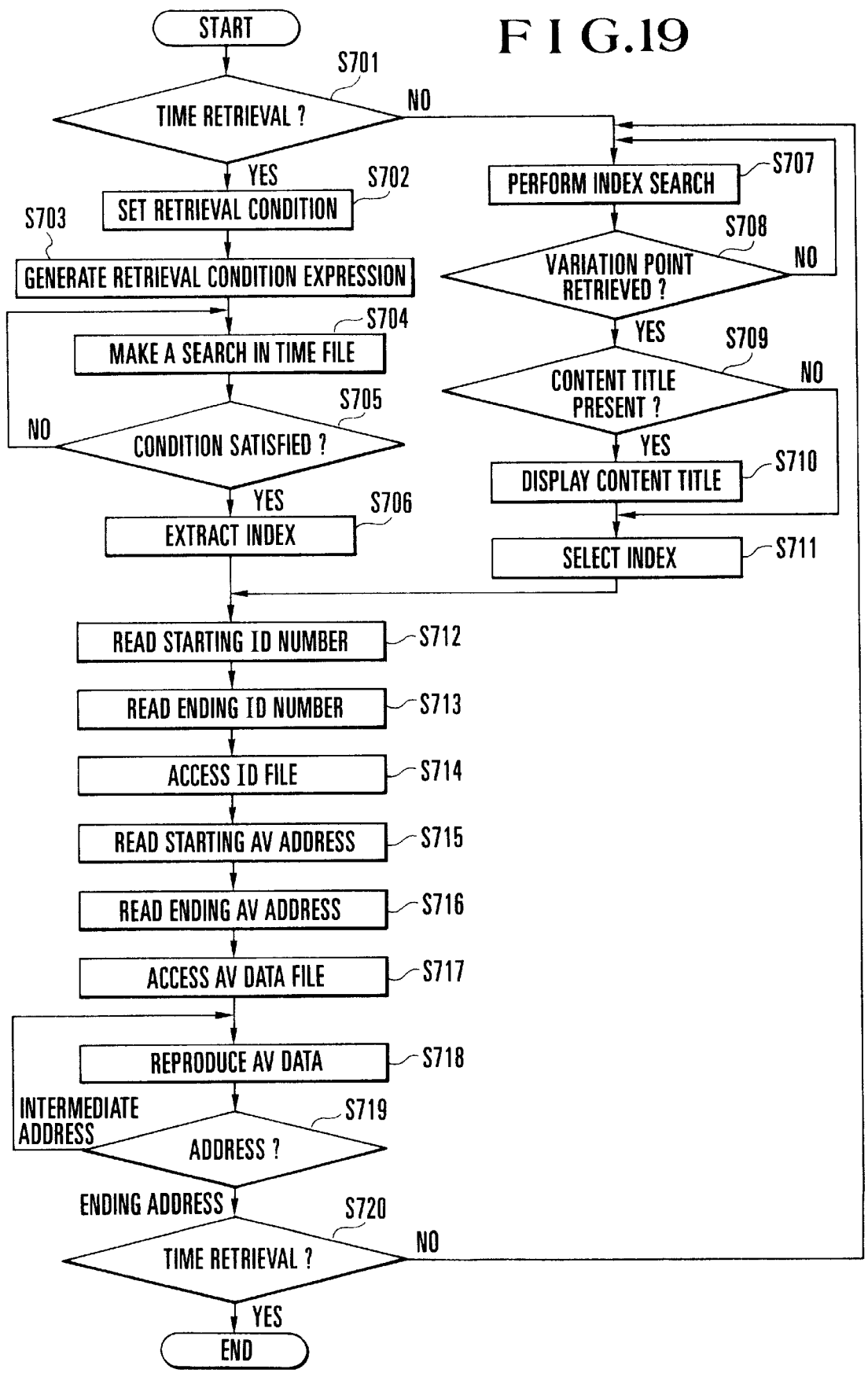
FIG. 19 is a flowchart showing the operational sequence of a search reproduction operation.

The operational sequences of the above-described recording and search reproduction of the AV data are shown in the flowcharts of FIGS. 18 and 19, respectively.

The recording operation according to the fourth embodiment will first be described with reference to FIG. 18.

In the flowchart shown in FIG. 18, if it is determined in Steps S601 and S602 that an instruction to start recording of AV data has been inputted from the operating keys 46 shown in FIG. 16, the process proceeds to Steps S603 to S607, in which an information content at the levels I, II or III is updated according to the presence or absence of a variation in each of the aforesaid "banner headline", "head" and "subhead" information, thereby generating index information.

Then, in Steps S608 and S609, the information content of the time file 53 is updated on the basis of the time information obtained when the index information was generated. Then, in Steps S610 and S611, a content title is registered in the contents file 51.

Then, in Step S612, a starting ID number is set which corresponds to the position in the AV data file 40 at which recording of the AV data is to be initiated. Subsequently, after an instruction to update the ID file 43 is issued in Step S613, the recording of the AV data is continued until it is determined in Step S614 that an instruction to end the current recording has been inputted from the operating keys 46.

During this recording operation, the ID number is incremented according to the number of data blocks of the recorded AV data. If an instruction to end the recording is detected in Step S614, the ID number obtained at that time is set as an ending ID number in Step S615. In Step S616, the processing of updating the ID file 43 is brought to an end.

The operation of the search reproduction will be described below with reference to FIG. 19.

In the flowchart shown in FIG. 19, it is determined in Steps S701 whether retrieval based on the time file 53 or the contents file 51 is to be executed. If retrieval based on the time file 53 is to be executed, the process proceeds to Step S702. In this case, a desired retrieval condition expression is generated in Steps S702 and S703, and in Steps S704 to S706, a search is made in the time file 53 to extract index information which satisfies the generated retrieval condition expression.

If retrieval based on the contents file 51 is to be executed, the process proceeds from Step S701 to Step S707. In this case, a search is made for a variation point of the desired index level, and index word information is detected. If a content title corresponding to the detected index word information is registered in the contents file 51, in Steps S709 and S710, the content title is displayed on a display (not shown). Then, in Step S711, the retriever selects index information corresponding to desired data to be retrieved, on the basis of the displayed information.

Then, in Steps S712 and S713, if the retrieval based on the time file 53 is being performed, a starting ID number and an ending ID number corresponding to the index information extracted in Steps S702 to S706 are read. If the retrieval based on the contents file 51 is being performed, a starting ID number and an ending ID number corresponding to the index information extracted in Steps S707 to S711 are read in Steps S712 and S713.

Then, in Steps S714 to S716, the read ID numbers are employed to access the ID file shown in FIG. 2(*b*), whereby the starting address and the ending address of the addresses at which the AV data is stored are extracted and read out. In Step S717, this address information is employed to access the AV data file 40, and in Step S718 the AV data is reproduced.

Then, if it is determined in Step S719 that the AV data has been reproduced up to the ending address, the process proceeds to Step S720. If it is determined in Step S720 that the current data retrieval is the retrieval based on the time file 53, the search reproduction is brought to an end. If it is determined in Step S720 that the current data retrieval is the retrieval based on the contents file 51, the process returns to Step S707, in which a data retrieval is again executed.

As is apparent from the above description, in accordance with the fourth embodiment, AV data is recorded in a solid-state memory device in units of data blocks, and a retrieval data file associated with retrieval data of fixed length is generated separately from the AV data of variable length. Since the retrieval data file is employed to perform retrieval of the AV data by means of address management, it is possible to increase the speed of the retrieval performed during search reproduction and it is also possible to efficiently utilize a limited memory area.

In particular, if the time file 53 is employed as the retrieval data file, it is possible to retrieve only data which satisfies a desired retrieval condition, during search reproduction. Accordingly, only desired data to be reproduced can be retrieved in a short time, whereby it is possible to improve the efficiency of retrieval to a further extent.

If the contents file 51 is employed as the retrieval data file, it is possible to select data to be retrieved, on the basis of visually displayed index word information. Accordingly, it is possible to easily select and retrieve only desired data, whereby it is possible to realize retrieval of greatly improved operability.

Although the above description has referred to the example in which the ID file 43, the time file 53 and the contents file 51 are generated as retrieval data files and retrieval of AV data is performed by using the retrieval data files, only the ID file 43 is generated and data retrieval may be performed by using the ID file 43. In this case, it is possible to simplify the arrangement of a data retrieving part of the recording and reproducing apparatus.

The operations of logical erasure and physical erasure of data, which are adopted in the fourth embodiment, will be described below with reference to FIGS. 20 to 28 while referring to the insert-recording of video and audio information by way of example.

Figure 20:
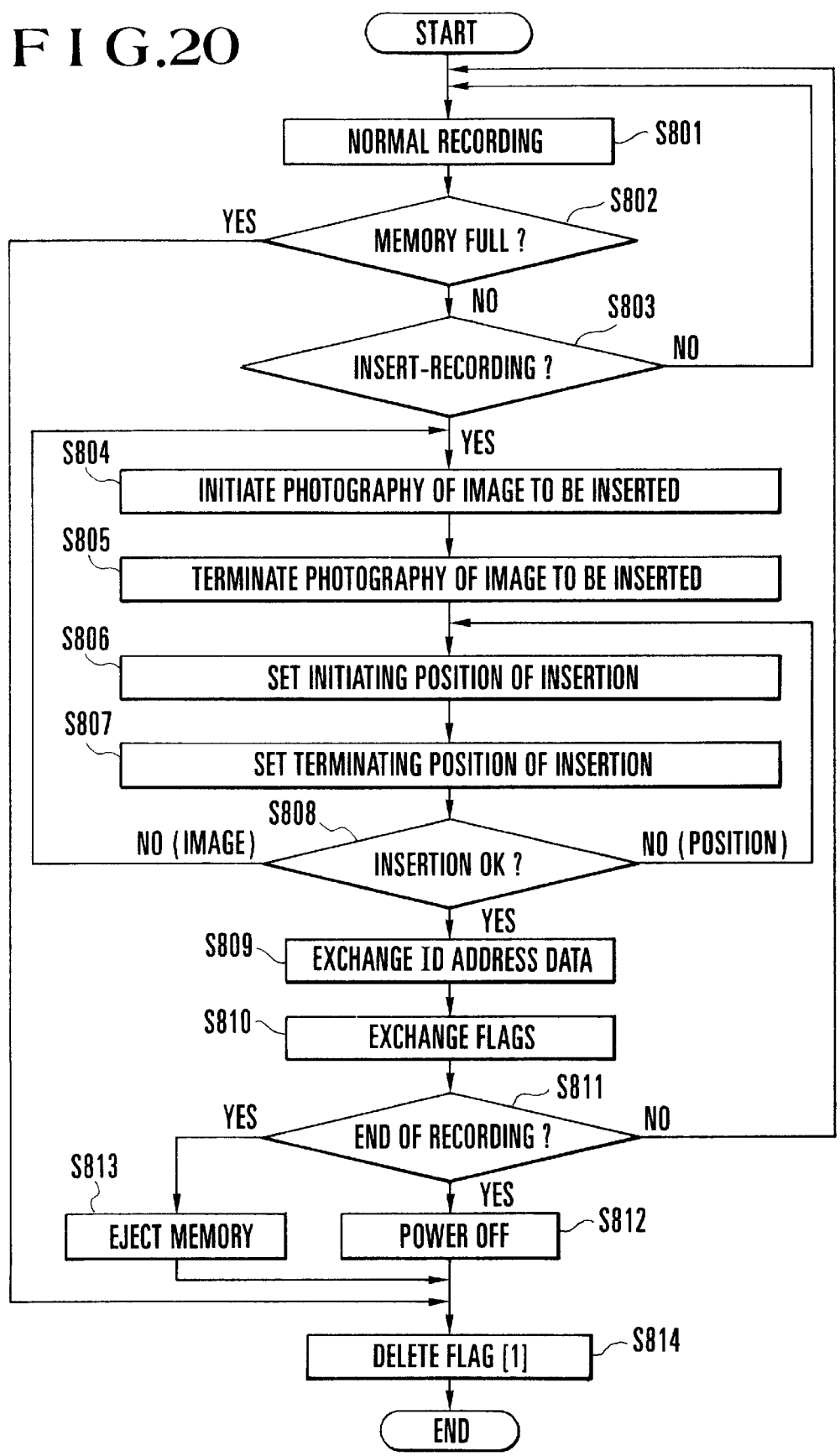
FIG. 20 is a flowchart showing the operational sequence of an insert-recording operation.

FIG. 20 is a flowchart showing the processing sequence of the insert-recording of video and audio information.

In the flowchart of FIG. 20, Steps S801 to S803 constitute the operational loop of a normal recording operation which is performed before insert-recording. Specifically, in Step S801, photography using a video camera (not shown) or the like is performed as described previously, and a data file for data retrieval is generated. Then, in Step S802, the state of use of a main memory in which to record AV data obtained from the photography is confirmed.

In the confirmation performed in Step S802, if it is determined that the memory area of the main memory is substantially full and there is no room to write new data, the process jumps to Step S814 to perform physical deletion of logically erased data, as will be described later. On the other hand, if it is determined that the memory area still has a room to write new data, the process proceeds to Step S803, in which it is confirmed whether an instruction to start insert-recording is present or absent. If there is no instruction to start insert-recording, the process returns to Step S801, in which the above-described normal recording is continued.

If an instruction to start insert-recording is inputted, the process exits from the operational loop of the above-described normal recording and proceeds from Step S803 to Step S804. In Step S804, inputting of a new image to be inserted is initiated. The inputting of the image is terminated in Step S805.

After the image to be newly inserted has been set in Steps S804 and S805, a position on the memory in which to insert this image is set in Steps S806 and S807. Incidentally, the setting of an image to be newly inserted and the setting of a position in which to insert the image may be performed in reverse order, and the setting of an image to be newly inserted may be performed after the setting of a position in which to insert the image.

If there is a one-to-one correspondence between an ID corresponding to an image to be newly inserted (the ID will be described in detail below with reference to a data construction example to be described later) and an ID corresponding to an image to be deleted when the image is newly inserted, it is possible to automatically set the image to be deleted by setting a position in which to newly insert the image.

Then, in Step S808, the insertion settings determined in Steps S804 to S807 for inserting the new image in the position are confirmed by simulation. If it is determined as the result of the confirmation that the transition between the newly inserted image and the preceding or seceding image is unsatisfactory, the process returns to Step S804 or S806 according to the cause of the unsatisfactory transition, and the image to be newly inserted or the position in which to newly insert the image is again set.

The loop of Steps S804 to S808 is repeated until a satisfactory simulation result can be obtained. After that, if a satisfactory transition from the newly inserted image to another image is achieved, the process proceeds to Steps S809 and S810, in which data exchange is actually executed between the set image to be inserted and the set image to be deleted.

The above-described processing of Steps S804 to S810 will be described below with reference to a construction example of data which will be illustrated below.

FIG. 22 is a view showing an apparent ID registration example of the ID file shown in FIG. 2(b). Sixty IDs of from ID-001 to ID-060 represent that the IDs correspond to data blocks in which a moving image for sixty seconds is recorded.

It is assumed that, in the moving image placed in the shown recorded state, an image for ten seconds which corresponds to ID-011 to ID-020 is replaced with a new image for ten seconds by the aforesaid insertion processing. In this case, as shown in FIG. 21(b), the respective deleted flags in ID data contained in old data blocks which correspond to ID-011 to ID-020 to be deleted are changed from "0" to "1" so that the state of each of the old data blocks is changed from active to deleted. Then, as shown in FIG. 21(a), the respective deleted flags in ID data contained in new data blocks to be inserted is set to "0" so that each of the states of the new data blocks is made active.

FIG. 23 shows the resultant state of the ID file as well as the states of the deleted flags.

As shown in FIG. 23, the IDS required for reproduction or retrieval of AV data are only IDS of from ID-010-0 to ID-060-0 for sixty data blocks. For this reason, in the ID file, only the IDS of from ID-001 to ID-060 for the sixty data blocks are apparently present as shown in FIG. 22. However, since the deleted flags are set to "1", the data blocks are logically deleted, but not physically deleted. Such data blocks (hereinafter referred to as "logically erased data") are actually present on the memory.

The IDS which correspond to the logically erased data are stored in, for example, a predetermined area close to a final address as shown in FIG. 23. Accordingly, by accessing the predetermined area, it can be confirmed whether there is a logically erased data block the deleted flag of which is set to "1".

In the above-described manner, the old data blocks to be deleted during insert-recording are held on the memory as the logically erased data the delated flags of which are set to "1". Accordingly, Steps S804 to S808 of FIG. 20, i.e., processing for setting the image to be newly inserted and that for setting the position in which to insert the image, can be repeated by any number of times by using the old data blocks.

If the setting processings are to be performed by N times, instead of setting the logically erased states of individual data blocks by using only the two values "0" and "1" of each of their deleted flags, it is also possible to set the logically erased states by using data representative of levels 0 to N according to the number of times of repetitions of the setting processings. In this case, it is possible to further increase the degree of freedom with which the processing for setting an image to be inserted and the processing for setting a position in which to insert the image are executed.

If a satisfactory transition between the images is achieved through the above-described processings for setting the new image to be inserted and for setting the position in which to insert the image, data exchange is actually executed between the set new image to be inserted and the image to be deleted. Specifically, recording address information for the data blocks which contain the new image to be inserted is stored in a memory area which corresponds to ID-011-0 to ID-020-0, whereas recording address information for the data blocks which contain the old image to be deleted is stored in the aforesaid predetermined area which corresponds to ID-0111 to ID-020-1. This processing of storing the address information corresponds to the processing of Step S809 and S810 shown in FIG. 20.

Although the above description has referred to the insert-recording of video information, the insert-recording of audio information is also performed in a similar manner.

If the data blocks in which the video or audio information is insert-recorded in the above-described manner are accessed in the order of the ID numbers of the ID file, addresses which will be accessed become discontinuous. However, in the fourth embodiment which employs a solid-state memory device as a recording medium as described previously, since data retrieval can be effected in a short time, video and audio information can be reproduced substantially continuously during the reading of AV data.

Operations subsequent to Step S810 will be described below with reference to FIG. 20.

After the aforesaid insert-recording has been completed in Step S810, it is determined in Step S811 whether insert-recording is to be applied to data blocks recorded in another position. If insert-recording is to be applied to data blocks recording in another position, the process returns to Step S801, in which an insert-recording operation similar to the above-described one is again started.

If it is determined in Step S811 that the insert-recording is to be brought to an end, the process proceeds to Step S812 or S813 according to the manner in which the insert-recording is brought to an end. If the insert-recording is to be brought to an end by removing a memory cartridge, the process proceeds to Step S814 via Step S813. In Step S814, deletion of the data blocks the deleted flags of which are set to "1" is performed. The deletion executed in Step S814 is the physical deletion of irreversibly deleting the data from the memory.

Although the above description has referred to the case in which there is a one-to-one correspondence between an ID corresponding to an image to be newly inserted and an ID corresponding to an image to be deleted when the image is newly inserted, the fourth embodiment can also be applied to a case where no one-to-one correspondence is present between both IDs.

Figure 24:
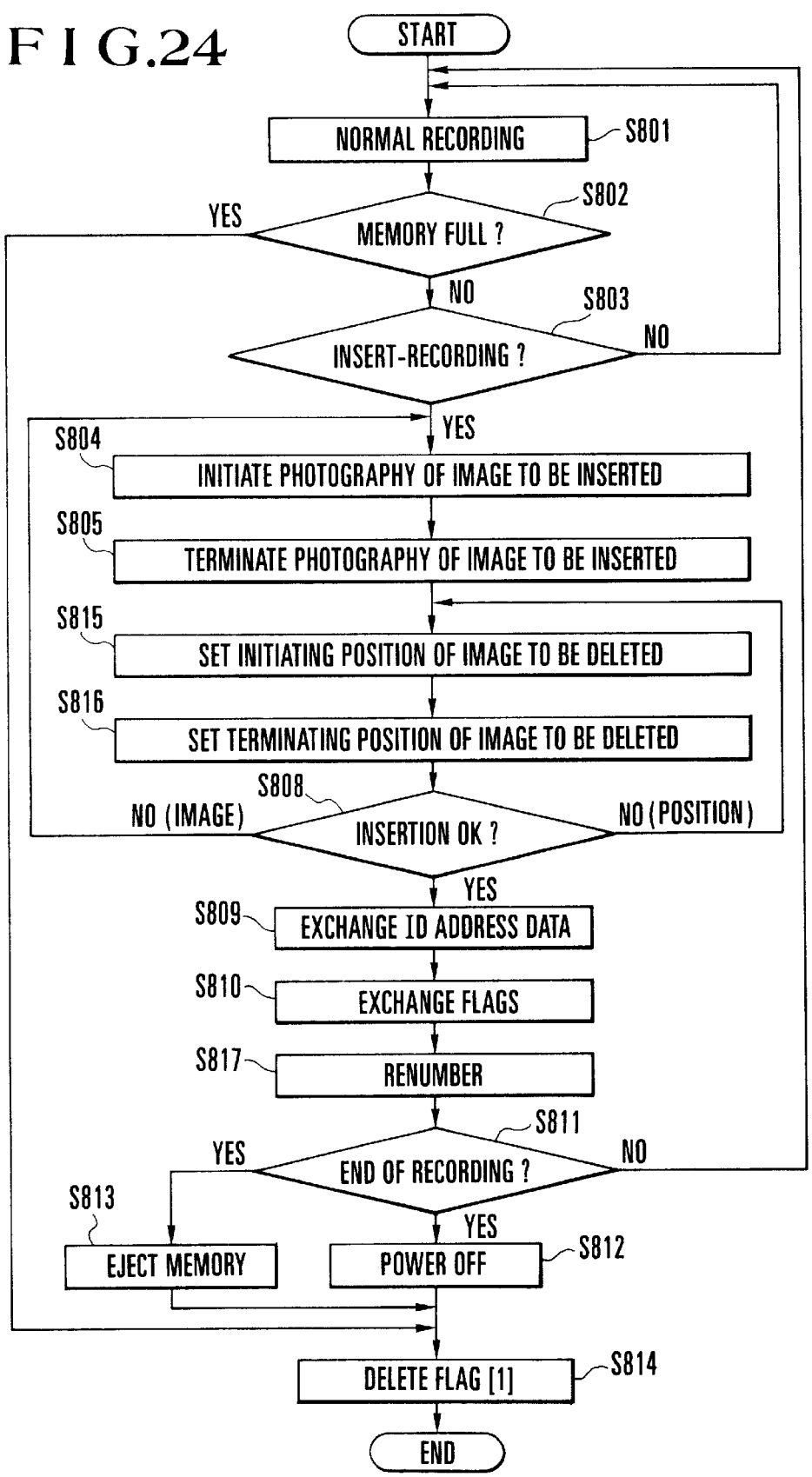
FIG. 24 is a flowchart showing another operational sequence of the insert-recording operation.

The processing sequence of insert-recording to be performed in such a case is shown in the flowchart of FIG. 24. In FIG. 24, the operations of the steps indicated by step numbers identical to those used in FIG. 20 are similar to the operations described above in connection with FIG. 20, and a description thereof is omitted for the sake of simplicity.

If there is no one-to-one correspondence between the aforesaid two IDs, even if a position in which to newly insert an image is set in the manner executed in Steps S806 and S807, an image to be deleted is not automatically set. Accordingly, in this case, an image to be deleted is set in Steps S815 and S816 of FIG. 24. Of course, the setting of an image to be inserted in Steps S804 and S805 and the setting of an image to be deleted in Step S815 and S816 may be performed in reverse order.

In the image setting loop formed by Steps S804, S805, S815, S816 and S808, the image to be inserted and the image to be deleted are set so that a satisfactory transition can be achieved between the image to be inserted and another image. After that, in Steps S809 and S810, data exchange is actually executed between the image to be inserted and the image to be deleted.

For example, if insert-recording is performed to replace an image for ten seconds which corresponds to ID-011 to ID-020 with a newly photographed image for five seconds in the ID file of FIG. 22, the state of the ID file as well as the state of the deleted flags are as shown in FIG. 25. In FIG. 25, a position which corresponds to ID-016-0 to ID-020-0 is in blank since there is no image to be newly inserted.

In this case, in Step S817 of FIG. 24, the processing of renumbering ID numbers is performed. The result obtained by renumbering the ID files shown in FIG. 25 is shown in FIG. 26. FIG. 26 shows the manner in which a portion corresponding to the aforesaid 5-second blank is cut and the total number of IDs has decreased to fifty-five, i.e., ID-001-0 to ID-055-0. The apparent state of the ID file at that time is as shown in FIG. 27.

Data addresses at which AV data corresponding to the renumbered IDs are stored need to be joined in correct order when the AV data are to be reproduced by using the ID file renumbered in the above-described manner. For this reason, as shown in FIGS. 28(a) and 28(b), NEXT-ID address information indicative of the storage address of ID data which follows ID data which is currently being reproduced are added as basic information for the ID data contained in a data block.

In the insert-recording of video information and audio information, data which is to be deleted instead of new data to be inserted can be specified in the way of globally specifying recording units grouped in accordance with the index information shown in FIG. 17.

In this case, in Steps S815 and S816 of FIG. 24, the setting of an image to be deleted is performed by using the index information shown in FIG. 17. Specifically, for example, if index information at a level of 1-1-2-0 is selected, an image for ten seconds of from ID-011-1 to ID-020-1 of FIG. 25 can be globally specified as an image to be deleted, on the basis of the corresponding starting and ending Nos., whereby insert-recording can be performed.

In the renumbering processing of Step S817 of FIG. 24, in addition to the renumbering of the ID numbers, renumbering of the index information is performed. Accordingly, it is possible to manage the ID numbers and the index information with a correspondence always established between the ID numbers and the index information, whereby it is possible to perform correct data retrieval even after insert-recording is performed.

As is apparent from the above detailed description, in accordance with each of the embodiments described above, a solid-state memory device is employed as an information recording medium, and video information and audio information as well as retrieval information for retrieval of the aforesaid video information and audio information are recorded in such a manner as to form individual predetermined memory units by correlating the video and audio information with the retrieval information. Accordingly, during search-reproduction, desired video and audio information are retrieved and reproduced by performing address management of the solid-state memory device on the basis of the retrieval information. Accordingly, it is possible to perform recording and reproduction of the video information and the audio information without using any mechanical component, so that it is possible to shorten the time which has heretofore been required to transport a recording medium, whereby retrieval can be effected in a short time. In addition, it is possible to prevent the reliability of data from being lowered by the recording medium undergoing a mechanical damage or the like. Accordingly, it is possible to provide a recording and reproducing apparatus having excellent information retrievability.

In particular, although video information and audio information both of which constitute main information are constructed as information of variable length to increase a data compression efficiency, retrieval information for retrieval of such information is constructed as information of fixed length and is recorded in a file which can be managed separately from the video and audio information. Accordingly, the amount of data to be recorded can be reduced so that a limited memory area can be efficiently utilized. Accordingly, it is possible to increase the recording time of each of the video and audio information, and the retrievability of the information can be improved to a further extent.

Also, during editing of information, before information to be deleted is physically completely erased from a solid-state memory device, the information to be deleted is stored in a logically erased state on the solid-state memory device by setting a recoverable, logically erased state through a predetermined operation. In addition to the feature of the aforesaid excellent information retrievability, the information which has been set to the logically erased state can be easily recovered, as required, and re-edited. Accordingly, it is possible to further improve the usefulness of information editing processing.

Further, address information indicative of a position in which is recorded information to be reproduced subsequently to information which is currently being reproduced is provided as one item of retrieval information. Accordingly, during reproduction of information, information items which are recorded spatially separately from each other can be correctly joined and continuously reproduced by address management using the address information. Accordingly, during editing of information, even in a case where there is a difference between the recording time of information to be newly inserted and the recording time of information to be deleted, so that if the former information and the latter information are exchanged to record the former formation, it may be impossible to assure the apparent continuity of the information, it is substantially possible to exchange the information to be deleted for the information to be newly inserted and record the new information. Accordingly, it is possible to achieve the degree of freedom which cannot be achieved by using a conventional recording medium.

Further, retrieval information is grouped into predetermined units and managed, and since information to be deleted during editing of information is globally set for each of the groups, the information to be deleted can be set by the extremely simple operation of specifying a desired group. Accordingly, it is possible to remarkably improve the operability of the editing of information.

What is claimed is:

1. A recording and reproducing apparatus, comprising:
   (a) means for obtaining a video and/or audio information coded by a variable-length coding method;
   (b) means for obtaining search information coded by a fixed-length coding method;
   (c) first generating means for multiplexing the search information and the video and/or audio information to obtain a first signal,
   said first generating means multiplexing the search information to the video and/or audio information at intervals of a predetermined time;
   (d) second generating means for generating a second signal composed of the search information;
   (e) recording means for recording the first and second signals in a memory device; and
   (f) reproducing means for reproducing the video and/or audio information according to the search information of the first signal and the search information of the second signal.

2. An apparatus according to claim 1, wherein the medium includes a solid memory.

3. An apparatus according to claim 1, wherein the medium includes a disc-like memory.

4. An apparatus according to claim 1, wherein the medium includes a card-like memory.

5. A recording apparatus, comprising:
   (a) coding means for coding an image signal by a variable-length coding method;
   (b) generating means for generating control data for searching the image signal;
   (c) first processing means for dividing the image signal coded by said coding means into a plurality of blocks and obtaining a plurality of recording blocks by multiplexing the control data to the plurality of blocks;
   (d) second processing means for generating a subordinate signal composed of the control data; and
   (e) recording means for forming a main signal composed of the plurality of recording blocks and writing the main signal and the subordinate signal into a memory device, said recording means writing the main signal in a first area of the memory device and writing the subordinate signal in a second area in the memory device.

6. An apparatus according to claim 5, wherein the control data includes ID data indicating addresses of the memory device at which the plurality of recording blocks are written.

7. An apparatus according to claim 5, further comprising reproducing means for reading the main signal from the memory device according to the subordinate signal written in the second area of the memory device.

8. An apparatus according to claim 7, wherein said reproducing means retrieves the image signal according to the control data in the plurality of recording blocks and the control data of the subordinate signal.

9. An apparatus according to claim 7, wherein said reproducing means includes decoding means for decoding the image signal by using a decoding method corresponding to the variable-length coding method.

10. An apparatus according to claim 5, wherein said first processing means multiplexes the control data to the plurality of blocks of the moving image signal at intervals of at predetermined time.

11. An apparatus according to claim 5, wherein said memory device includes a solid-state memory device.

12. An apparatus according to claim 5, wherein the image signal represents a moving image.

13. A recording apparatus, comprising:
   coding means for coding a video and/or audio information by a variable-length coding method;
   generating means for generating a search information having a predetermined code length, the search information including discrimination data indicating whether the coded video and/or audio information is effective;
   processing means for dividing the video and/or audio information coded by said coding means into a plurality of blocks and obtaining a plurality of recording blocks by multiplexing the search information to the plurality of blocks of the video and/or audio information; and
   recording means for forming a main information composed of the plurality of recording blocks and writing the main information into a storage device in the recording block units, wherein said recording means further forming a subordinate information composed of the search information and writing the main information and the subordinate information into the storage device, said recording means writing the main information in a first area of the storage device and writing the subordinate information in a second area of the storage device.

14. An apparatus according to claim 13, further comprising reproducing means for reading the main information from the storage device.

15. An apparatus according to claim 14, wherein said recording means determines an area of the storage device into which the main information is to be written according to the discrimination data in the main information reproduced by said reproducing means.

16. An apparatus according to claim 13, wherein said storage device includes a solid-state memory.

17. A recording apparatus, comprising:

input means for inputting an information signal;

generating means for generating control data for retrieving the information signal;

first processing means for dividing the information signal input by said input means into a plurality of blocks and obtaining a plurality of recording blocks by multiplexing the control data to the plurality of blocks;

second processing means for generating a subordinate signal composed of the control data; and recording means for forming a main signal composed of the plurality of recording blocks and writing the main signal and the subordinate signal into a storage device, said recording means writing the main signal in a first area of the storage device and writing the subordinate signal in a second area of the storage device.

18. An apparatus according to claim 17, wherein the information signal includes a moving image signal.

19. An apparatus according to claim 18, wherein said input means includes coding means for coding the moving image signal by a variable-length coding method, and wherein said first processing means divides the moving image signal coded by said coding means into the plurality of blocks.

20. An apparatus according to claim 17, further comprising reproducing means for reading the main signal and the subordinate signal from the storage device.

21. An apparatus according to claim 20, wherein said reproducing means retrieves the information signal written in the storage device according to the control data in the recording blocks of the main signal and the control data in the subordinate signal.

22. An apparatus according to claim 17, wherein the storage device includes a solid-state memory.

23. An apparatus according to claim 17, wherein said input means comprises compressing means for compressing an information amount of the information signal, and wherein said first processing means divides the information signal compressed by said compressing means into the plurality of blocks.

24. An apparatus according to claim 23, wherein the information signal includes an image signal.

25. An apparatus according to claim 23, wherein the information signal includes an audio signal.

26. An apparatus according to claim 17, wherein the control data comprises first data and second data, the control data of the main signal including the first data and the control data of the subordinate signal including the first and second data.

27. An apparatus according to claim 26, wherein the second data are provided for one recording block.

28. An apparatus according to claim 26, wherein the second data are provided for predetermined number of blocks.

29. An apparatus according to claim 26, wherein said generating means changes contents of the second data at predetermined period.

30. An apparatus according to claim 26, further comprising instruction means for instructing a recording operation of said recording means, said generating means changing contents of the second data in response to the instruction.

31. An apparatus according to claim 26, wherein the first data represent addresses of the storage device at which the plurality of recording blocks are recorded and the second data represent time information at which the information signal is recorded.

32. An apparatus according to claim 26, wherein the first data represent addresses of the storage device at which the plurality of recording blocks are recorded and the second data represent index information.

33. An apparatus according to claim 32, further comprising instruction means for instructing a recording operation of said recording means, said generating means changing contents of the index information in response to the instruction.

34. An apparatus according to claim 17, wherein a block length of each of the plurality blocks is variable.

35. A recording apparatus, comprising:

input means for inputting an information signal;

generating means for generating control data for retrieving the information signal, the control data comprising first data and second data;

first processing means for dividing the information signal input by said input means into a plurality of blocks and obtaining a plurality of recording blocks by multiplexing the first data to the plurality of blocks;

second processing means for generating a subordinate signal composed of the first and second data; and recording means for forming a main signal composed of the plurality of recording blocks and writing the main signal and the subordinate signal into a storage device, the first data representing addresses of the storage device at which the plurality of recording blocks are written and the second data representing an index, said recording means writing the main signal in a first area of the storage device and writing the subordinate signal in a second area of the storage device.

36. A recording apparatus, comprising:

input means for inputting an information signal;

generating means for generating control data for retrieving the information signal;

first processing means for dividing the information signal input by said input means into a plurality of blocks and obtaining a plurality of recording blocks by multiplexing the control data to the plurality of blocks, a block length of each of the plurality of blocks being variable;

second processing means for generating a subordinate signal composed of the control data; and recording means for forming a main signal composed of the plurality of recording blocks and writing the main signal and the subordinate signal into a storage device, said recording means writing the main signal in a first area of the storage device and writing the subordinate signal in a second area of the storage device.

37. A recording apparatus, comprising:

input means for inputting a moving image signal;

generating means for generating control data for retrieving the moving image signal;

first processing means for dividing the moving image signal input by said input means into a plurality of blocks and obtaining a plurality of recording blocks by multiplexing the control data to the plurality of blocks;

second processing means for generating a subordinate signal composed of the control data; and recording means for forming a main signal composed of the plurality of recording blocks and writing the main signal and the subordinate signal into a storage device, said recording means writing the main signal in a first area of the storage device and writing the subordinate signal in a second area of the storage device.

38. An apparatus according to claim 17, wherein the control data of the main signal and the control signal of the subordinate signal comprise ID data representing block numbers of the recording blocks, the ID data being multiplexed to each of the plurality of blocks.

39. An apparatus according to claim 38, wherein the control data of the subordinate signal further comprise address data indicating addresses of the storage device at which the plurality of recording blocks each of which has the ID data are recorded.

40. An apparatus according to claim 39, further comprising reproducing means for reproducing the main signal and the subordinate signal, said reproducing means reproducing the main signal according to the ID data and the address data of the subordinate signal and the ID data of the plurality of recording blocks.

41. An apparatus according to claim 17, wherein the control data of the subordinate signal comprise ID data representing block numbers of the plurality of recording blocks and address data indicating addresses of the storage device at which the plurality of recording blocks corresponding to the ID data are recorded.

42. An apparatus according to claim 41, wherein the control data in the main signal comprise the ID data, the ID data being multiplexed to each of the plurality of blocks.

43. An apparatus according to claim 17, wherein the information signal includes a digital moving image signal, said first processing apparatus dividing the input digital moving image signal at intervals of predetermined time, each of the plurality of blocks corresponding to the input digital moving image signal of the predetermined time.

44. An apparatus according to claim 43, wherein said first processing means comprises compressing means for compressing an information amount of the digital moving image signal and coding the digital moving image signal.

45. An apparatus according to claim 44, wherein said compressing means compresses the information amount of the digital moving image signal according to a correlation between a plurality of frames of the digital moving image signal.

46. An apparatus according to claim 44, wherein said compressing means performs said compressing and coding operation according to MPEG-2 system.

* * * * *

UNITED STATES PATENT AND TRADEMARK OFFICE
CERTIFICATE OF CORRECTION

PATENT NO. : 5,966,495
DATED : October 12, 1999
INVENTOR(S) : Koji Takahashi, et al.

It is certified that error appears in the above-identified patent and that said Letters Patent are hereby corrected as shown below:

Col. 7, line 4, after "circuit" insert -- 11. --.
Col. 22, line 13, delete "IDS" and insert -- IDs --.
Col. 22, line 15, delete "IDS" and insert -- IDs --.
Col. 22, line 16, delete "IDS" and insert -- IDs --.
Col. 22, line 21, delete "IDS" and insert -- IDs --.
Col. 22, line 55, delete "ID-0111" and insert -- ID-011-1 --.
Col. 26, line 32, delete "at prdetermined" and insert -- a predetermined --.

Signed and Sealed this

Tenth Day of April, 2001

Attest:

NICHOLAS P. GODICI

Attesting Officer     Acting Director of the United States Patent and Trademark Office